US012510002B2

(12) United States Patent
Sibbach et al.

(10) Patent No.: US 12,510,002 B2
(45) Date of Patent: Dec. 30, 2025

(54) LUBRICATION SYSTEM FOR A TURBINE ENGINE

(71) Applicant: General Electric Company, Schenectady, NY (US)

(72) Inventors: Arthur W. Sibbach, Boxford, MA (US); Brandon W. Miller, Middletown, OH (US); Andrew Hudecki, Milford, OH (US); Randy M. Vondrell, Newport, KY (US); Jeffrey D. Rambo, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/517,878

(22) Filed: Nov. 22, 2023

(65) Prior Publication Data

US 2025/0020070 A1 Jan. 16, 2025

Related U.S. Application Data

(60) Provisional application No. 63/513,302, filed on Jul. 12, 2023.

(51) Int. Cl.
  *F01D 25/20* (2006.01)
  *F02C 7/06* (2006.01)
(52) U.S. Cl.
  CPC ............... *F01D 25/20* (2013.01); *F02C 7/06* (2013.01); *F05D 2220/32* (2013.01); *F05D 2260/98* (2013.01)
(58) Field of Classification Search
  CPC ....... F01D 25/20; F01D 25/18; F16N 2210/02
  See application file for complete search history.

(56) References Cited

U.S. PATENT DOCUMENTS

| 3,147,821 | A | * | 9/1964 | Eggenberger | ........... F16N 29/02 |
| | | | | | 184/65 |
| 3,797,561 | A | * | 3/1974 | Clark | ........................ F28F 3/12 |
| | | | | | 60/39.83 |
| 4,137,705 | A | * | 2/1979 | Andersen | ................... F02C 7/14 |
| | | | | | 60/728 |
| 4,245,465 | A | * | 1/1981 | Milo | ....................... F01D 25/18 |
| | | | | | 60/39.08 |

(Continued)

FOREIGN PATENT DOCUMENTS

EP       2224120 A2 *  9/2010  ............. F01D 25/20

*Primary Examiner* — Michael A Riegelman
(74) *Attorney, Agent, or Firm* — Venable LLP; Andrew W. Bradshaw; Michele V. Frank

(57) ABSTRACT

A lubrication system for a turbine engine. The turbine engine includes a fan having a fan shaft and one or more rotating components. The lubrication system includes one or more tanks that stores lubricant therein, a primary lubrication system, and an auxiliary lubrication system. The primary lubrication system supplies the lubricant from the one or more tanks to the one or more rotating components during normal operation of the turbine engine. The auxiliary lubrication system includes an auxiliary pump that is coupled to the fan shaft. The auxiliary lubrication system supplies the lubricant from the one or more tanks to the one or more rotating components based on a pressure of the lubricant in the primary lubrication system. Rotation of the fan shaft causes the auxiliary pump to pump the lubricant to the one or more rotating components.

16 Claims, 10 Drawing Sheets

(56) References Cited

U.S. PATENT DOCUMENTS

| | | | | |
|---|---|---|---|---|
| 4,431,372 A * | 2/1984 | Dadhich | | F01D 25/20 |
| | | | | 184/6.28 |
| 4,845,483 A * | 7/1989 | Negishi | | G06K 15/12 |
| | | | | 347/225 |
| 5,245,820 A * | 9/1993 | Zalewski | | F02C 7/277 |
| | | | | 60/39.08 |
| 5,845,483 A * | 12/1998 | Petrowicz | | F02C 7/262 |
| | | | | 60/788 |
| 7,216,473 B1 * | 5/2007 | McArthur | | F01D 25/18 |
| | | | | 60/39.08 |
| 7,662,059 B2 * | 2/2010 | McCune | | F01D 25/20 |
| | | | | 184/6.12 |
| 7,815,536 B2 * | 10/2010 | Jansen | | H02K 7/116 |
| | | | | 290/55 |
| 7,849,668 B2 * | 12/2010 | Sheridan | | F01D 25/20 |
| | | | | 384/473 |
| 7,883,438 B2 | 2/2011 | McCune | | |
| 8,007,253 B2 * | 8/2011 | Dooley | | F04D 29/047 |
| | | | | 415/72 |
| 8,113,317 B2 * | 2/2012 | Delaloye | | F01D 25/20 |
| | | | | 184/6.3 |
| 8,201,662 B2 * | 6/2012 | Delaloye | | F01D 25/20 |
| | | | | 184/6.3 |
| 8,230,974 B2 * | 7/2012 | Parnin | | F01D 25/18 |
| | | | | 184/6.11 |
| 8,307,626 B2 * | 11/2012 | Sheridan | | F01D 25/20 |
| | | | | 184/29 |
| 8,517,148 B2 * | 8/2013 | Portlock | | F01D 25/18 |
| | | | | 184/6.12 |
| 8,627,667 B2 * | 1/2014 | Lozier | | B64D 37/04 |
| | | | | 60/39.08 |
| 8,702,373 B1 * | 4/2014 | Valva | | F16H 57/0495 |
| | | | | 416/174 |
| 9,086,055 B2 * | 7/2015 | Subramaniam | | F03D 80/70 |
| 9,903,227 B2 * | 2/2018 | Cigal | | F01D 25/18 |
| 10,145,276 B2 * | 12/2018 | Parnin | | F01M 11/10 |
| 10,167,873 B2 * | 1/2019 | Sheridan | | F02C 7/32 |
| 10,196,926 B2 * | 2/2019 | Ketchum | | F01D 25/20 |
| 10,208,624 B2 * | 2/2019 | Duong | | F02C 3/107 |
| 10,267,233 B2 * | 4/2019 | Mastro | | F02C 3/107 |
| 10,316,855 B2 * | 6/2019 | Mastro | | F04D 29/329 |
| 10,371,007 B2 * | 8/2019 | Cigal | | F01D 25/20 |
| 10,513,949 B2 * | 12/2019 | Parnin | | F16H 57/0442 |
| 10,526,913 B2 * | 1/2020 | Roberge | | F02C 7/36 |
| 10,570,824 B2 * | 2/2020 | Schwarz | | F16H 57/0482 |
| 10,577,974 B2 | 3/2020 | Valva et al. | | |
| 10,634,053 B2 * | 4/2020 | Schwarz | | F16H 57/0471 |
| 10,683,774 B2 * | 6/2020 | Chalaud | | F01D 25/20 |
| 10,801,413 B2 * | 10/2020 | Roberge | | F02C 6/14 |
| 11,092,037 B2 | 8/2021 | Valva et al. | | |
| 11,215,078 B2 * | 1/2022 | Menczykalski | | F01D 25/20 |
| 12,160,156 B2 * | 12/2024 | Cooling | | H02K 11/21 |
| 2002/0083983 A1 * | 7/2002 | Coha | | F02M 37/0094 |
| | | | | 137/565.22 |
| 2010/0326048 A1 * | 12/2010 | Lozier | | F02K 3/06 |
| | | | | 60/262 |
| 2011/0168494 A1 * | 7/2011 | Subramaniam | | F03D 80/70 |
| | | | | 184/6.12 |
| 2012/0103728 A1 * | 5/2012 | Portlock | | F16H 57/0479 |
| | | | | 184/6.12 |
| 2016/0131034 A1 * | 5/2016 | Chilton | | F01D 25/16 |
| | | | | 184/6.11 |
| 2016/0160686 A1 * | 6/2016 | Cigal | | F16H 57/045 |
| | | | | 184/6.11 |
| 2017/0114662 A1 * | 4/2017 | Mastro | | F02C 3/107 |
| 2017/0175874 A1 * | 6/2017 | Schwarz | | F16H 57/0479 |
| 2018/0073395 A1 * | 3/2018 | Parnin | | F16H 57/0442 |
| 2018/0156066 A1 * | 6/2018 | Chalaud | | F01D 25/14 |
| 2018/0321073 A1 * | 11/2018 | Cleyet | | F16N 19/003 |
| 2019/0292944 A1 * | 9/2019 | Mason | | F01M 1/02 |
| 2019/0323597 A1 * | 10/2019 | Sheridan | | F01D 19/00 |
| 2019/0353172 A1 * | 11/2019 | Barger | | F02C 7/36 |
| 2019/0376416 A1 | 12/2019 | Mastro | | |
| 2020/0291817 A1 * | 9/2020 | Leque | | F01M 11/064 |
| 2021/0355875 A1 * | 11/2021 | Jacquemard | | F02C 7/06 |
| 2024/0044289 A1 * | 2/2024 | Jacquemard | | B64D 27/02 |
| 2024/0280170 A1 * | 8/2024 | Gravina | | F16H 57/0424 |

* cited by examiner

LUBRICATION SYSTEM FOR A TURBINE ENGINE

CROSS-REFERENCE TO RELATED APPLICATIONS

This application claims priority to U.S. Provisional Application No. 63/513,302 filed Jul. 12, 2023, the entire contents of which is hereby incorporated by reference.

TECHNICAL FIELD

The present disclosure relates generally to lubrication systems, for example, for turbine engines.

BACKGROUND

A turbine engine generally includes a fan and a core section arranged in flow communication with one another. The turbine engine includes one or more bearings that support rotation of the one or more components of the turbine engine. A lubrication system provides a lubricant to the one or more bearings of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
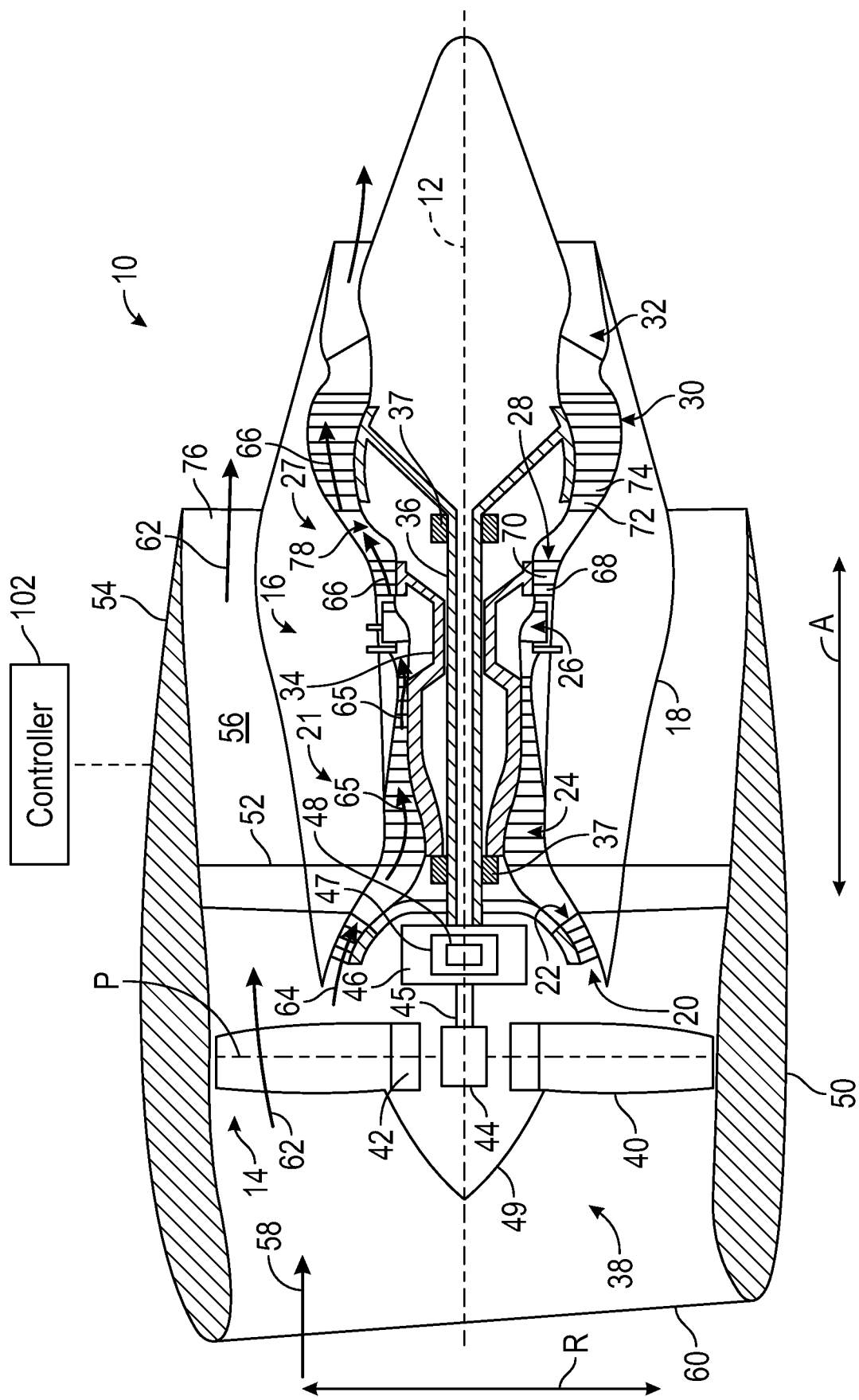
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "normal operation" of a turbine engine is intended to mean when the turbine engine is operating, and a primary lubrication system of the turbine engine is supplying lubricant to one or more rotating components of the turbine engine.

As used herein, "windmill" or "windmilling" is a condition when the fan and the low-pressure shaft of the turbine engine continue to rotate at low speeds, while the high-pressure shaft rotates slowly or even stops. Windmilling can occur when the turbine engine is shut down, but air still flows across the fan, such as during an in-flight engine shutdown or when the turbine engine is on the ground and the fan is rotating in the presence of wind when the turbine engine is shutdown. During a shutdown, e.g., while the aircraft is on the ground, the fan may also rotate in either direction depending upon the stationary position of the turbine engine relative to the ambient wind. Airflow entering the fan exhaust may exit the fan inlet in an opposite direction as a direction of operation and cause the fan to rotate in an opposite rotational direction compared to the intended operational rotational direction.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified.

In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values, or endpoints defining range(s) of values.

The present disclosure provides for a turbine engine having a lubrication system. The turbine engine includes a fan having a fan shaft. The turbine engine includes one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more gearbox bearings for a gearbox assembly of the turbine engine. The one or more gearbox bearings allow rotation of the one or more gears of the gearbox assembly about the one or more gearbox bearings. In one embodiment, one or more of the bearings are journal bearings. The one or more bearings can include any type of bearings, such as, for example, roller bearings, or the like. The lubrication system supplies lubricant (e.g., oil) to the one or more rotating components. The lubrication system includes one or more tanks that store lubricant therein, and a primary lubrication system having a primary pump and a primary lubricant supply line. During normal operation of the turbine engine, the primary pump pumps the lubricant from the one or more tanks to the one or more rotating components through the primary lubricant supply line.

The bearings, especially journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Such auxiliary lubrication systems, however, typically operate based on a speed of the fan such that the auxiliary lubrication system operates only when the fan speed is below a threshold speed, such as during a shutdown of the turbine engine. Such auxiliary lubrication systems may be unable to operate to supply the lubricant to the one or more rotating components during operation of the turbine engine, for example, when the turbine engine is operating (e.g., the fan speed is greater than the threshold speed), and the primary lubrication system is unable to provide the lubricant to the one or more rotating components. Further, the auxiliary pump requires added complexity to provide the lubricant during high speeds, such as during operation of the turbine engine, and during low speeds, such as during windmilling (e.g., in-flight or on the ground). Further, the auxiliary pump requires added complexity to provide the lubricant while the fan windmills in either direction (e.g., the fan rotates clockwise or counter-clockwise).

Accordingly, the present disclosure provides an auxiliary lubrication system that supplies the lubricant to the one or more rotating components during any time that the primary lubrication system is unable to supply the lubricant. The auxiliary lubrication system includes a pump (e.g., a bi-directional pump) that is coupled to the fan shaft through a pump shaft. The auxiliary lubrication system may include a clutch that is coupled to the pump shaft. The clutch engages or disengages the pump shaft based on a pressure of the lubricant in the primary lubricant system. For example, the clutch disengages the pump shaft such that the auxiliary pump does not operate when the pressure of the lubricant in the primary lubrication system is greater than a primary pressure threshold. The clutch engages the pump shaft such that the auxiliary pump operates when the pressure of the lubricant in the primary lubrication system is less than the primary pressure threshold. In this way, the auxiliary lubrication system supplies the lubricant to the one or more rotating components while the turbine engine is operating and if the primary lubrication system fails and can no longer supply the lubricant to the one or more rotating components.

In one embodiment, the auxiliary lubrication system includes a uni-directional pump and a pair of one-way clutches (e.g., sprag clutches) that operate in opposite directions to convert bi-directional rotation of the fan shaft into a singular rotational direction of the auxiliary pump. In this way, the auxiliary pump can operate in a single rotational direction to pump the lubricant to the one or more rotating components while the fan rotates in either direction (e.g., clockwise or counterclockwise). Such a configuration enables a less complex pump as compared to a bi-directional pump.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes a compressor section 21, a combustion section 26, and a turbine section 27. The turbo-engine 16 depicted is substantially enclosed within an outer casing 18 that is substantially tubular and defines an annular inlet 20. As schematically shown in FIG. 1, the compressor section 21 includes a booster or a low pressure (LP) compressor 22 followed downstream by a high pressure (HP) compressor 24, the combustion section 26 is downstream of the compressor section 21, and the turbine section 27 is downstream of the combustion section 26 and includes a high pressure (HP) turbine 28 followed downstream by a low pressure (LP) turbine 30. The turbo-engine 16 also includes a jet exhaust nozzle section 32. As depicted, the turbo-engine 16 includes a high pressure (HP) shaft 34 or a spool that drivingly connects the HP turbine 28 to the HP compressor 24. Rotation of the HP shaft 34 causes the HP turbine 28 and the HP compressor 24 to rotate in unison. The turbo-engine 16 includes a low pressure (LP) shaft 36 that drivingly connects the LP turbine 30 to the LP compressor 22. Rotation of the LP shaft 36 causes the LP turbine 30 and the LP compressor 22 to rotate in unison. The HP shaft 34, the LP shaft 36, or both the HP shaft 34 and the LP shaft 36 are supported by one or more engine bearings 37 that allow the HP shaft 34 and the LP shaft 36 to rotate. The one or more engine bearings 37 can include any type of bearings, such as, for example, roller bearings, or the like. The turbine engine 10 can include any number of engine bearings 37 for supporting various rotating components within the turbine engine 10. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison, as detailed further below. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears 47 for adjusting the rotational speed of the fan shaft 45 and, thus, the fan 38 relative to the LP shaft 36. The gearbox assembly 46 also includes one or more gearbox bearings 48 for supporting rotation of one or more of the plurality of gears 47. The gearbox bearings 48 can include any type of bearings, such as, for example, journal bearings, roller bearings, or the like.

Referring still to the exemplary embodiment of FIG. 1, the disk 42 is covered by a fan hub 49 that is aerodynamically contoured to promote an airflow through the plurality of fan blades 40. In addition, the fan section 14 includes an annular fan casing or a nacelle 50 that circumferentially surrounds the fan 38. In some embodiments, the nacelle 50 circumferentially surrounds at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, generating compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy and kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy and the kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 102 is in communication with the turbine engine 10 for controlling aspects of the turbine engine 10. For example, the controller 102 is in two-way communication with the turbine engine 10 for receiving signals from various sensors and control systems of the turbine engine 10 and for controlling components of the turbine engine 10, as detailed further below. The controller 102, or components thereof, may be located onboard the turbine engine 10, onboard the aircraft, or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
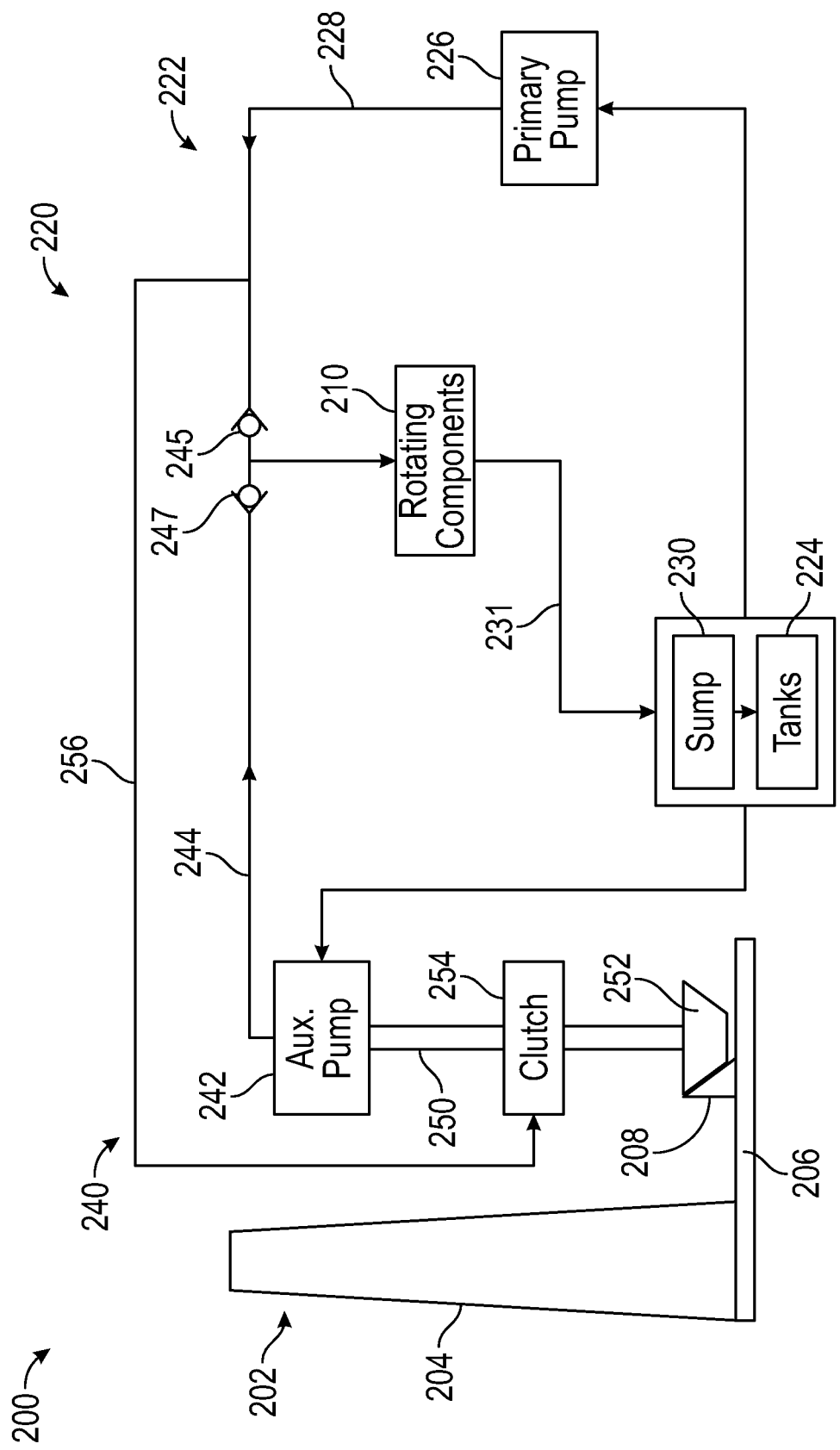
FIG. 2 is a schematic view of a turbine engine having a lubrication system, according to the present disclosure.

FIG. 2 is a schematic view of a turbine engine 200 having a lubrication system 220, according to the present disclosure. The turbine engine 200 can be utilized as the turbine engine 10 of FIG. 1 and includes a fan 202 having a plurality of fan blades 204 coupled to a fan shaft 206. The fan shaft 206 includes a fan shaft gear 208. The turbine engine 200 includes one or more rotating components 210 that allow various components (e.g., shafts, gears, etc.) of the turbine engine 200 to rotate. The one or more rotating components 210 can be, for example, shafts (e.g., the HP shaft 34 or the LP shaft 36 of FIG. 1), gears (e.g., the plurality of gears 47 of FIG. 1), or bearings including engine bearings (e.g., the engine bearings 37 of FIG. 1) or gearbox bearings (e.g., the gearbox bearings 48 of FIG. 1). The one or more rotating components 210 can embody any of the rotating components of the turbine engine 200.

The lubrication system 220 includes a primary lubrication system 222, one or more tanks 224, and an auxiliary lubrication system 240. The primary lubrication system 222 includes a primary pump 226, and a primary lubricant supply line 228. The one or more tanks 224 store lubricant therein. The lubricant can include any type of lubricant for lubricating the one or more rotating components 210 of the turbine engine 200. For example, the lubricant is oil, or the like. The one or more tanks 224 can include at least one of a primary tank or an auxiliary tank. The primary lubricant supply line 228 is in fluid communication with the one or more tanks 224 and the one or more rotating components 210 for supplying the lubricant from the one or more tanks 224 to the one or more rotating components 210. The primary pump 226 is in fluid communication with the primary lubricant supply line 228 to pump the lubricant from the one or more tanks 224 to the one or more rotating components 210 through the primary lubricant supply line 228. The lubrication system 220 includes a sump 230 that collects the lubricant that drains from the one or more rotating components 210. The sump 230 is in fluid communication with the one or more tanks 224 for supplying the lubricant from the sump 230 to the one or more tanks 224. In some embodiments, the lubrication system 220 includes a sump pump that pumps the lubricant from the sump 230 to the one or more tanks 224.

The auxiliary lubrication system 240 includes an auxiliary (aux.) pump 242 and an auxiliary lubricant supply line 244. The auxiliary lubricant supply line 244 is in fluid communication with the one or more tanks 224 and the one or more rotating components 210. While the auxiliary lubricant supply line 244 is depicted as a separate flow line, similar to the primary lubricant supply line 228 in FIG. 2, the auxiliary lubricant supply line 244 can form a part of the primary lubricant supply line 228. The auxiliary pump 242 is in fluid communication with the auxiliary lubricant supply line 244.

The lubrication system 220 includes one or more valves 245, 247 in fluid communication with the primary lubricant supply line 228 and the auxiliary lubricant supply line 244. For example, the one or more valves 245, 247 includes a first valve 245 in fluid communication with the primary lubricant supply line 228 and a second valve 247 in fluid communication with the auxiliary lubricant supply line 244. The one or more valves 245, 247 are check valves in FIG. 2, but can include any type of valve for allowing the lubricant to flow through, or for preventing the lubricant from flowing through the primary lubricant supply line 228 or the auxiliary lubricant supply line 244, as detailed further below.

The auxiliary pump 242 is coupled to the fan shaft 206. For example, the auxiliary pump 242 includes a pump shaft 250 that is coupled to the fan shaft 206. The pump shaft 250 is coupled to the fan shaft 206 by a pump shaft gear 252 that is intermeshed with the fan shaft gear 208. In this way, rotation of the fan shaft 206 causes the pump shaft 250 to rotate, thereby powering the auxiliary pump 242. The auxiliary pump 242 is a bi-directional pump that pumps the lubricant from the one or more tanks 224 to the one or more rotating components 210 through the auxiliary lubricant supply line 244 regardless of the direction of rotation of the fan shaft 206. Exemplary bi-directional pumps are detailed below with respect to FIGS. 10 and 11. The auxiliary pump 242 can include any type of bi-directional pump, such as a positive displacement pump, for example, a piston pump, a gear pump, a generated rotor (gerotor), a rotary pump, a peristaltic pump, or the like. The auxiliary pump 242 pumps the lubricant from the one or more tanks 224 to the one or more rotating components 210 when the fan shaft 206 rotates in a first rotational direction and when the fan shaft 206 rotates in a second rotational direction that is opposite the first rotational direction. For example, the first rotational direction is the rotational direction of the fan shaft 206 when the turbine engine 200 is operating, and the second rotational direction is opposite of the rotational direction of the fan shaft 206 during operation (e.g., when the fan 202 is windmilling in the second rotational direction).

The auxiliary lubrication system 240 includes a clutch 254 that controls the operation of the auxiliary pump 242. For example, the clutch 254 is coupled with the pump shaft 250 and engages the pump shaft 250 to operate the auxiliary pump 242 and disengages the pump shaft 250 to prevent operation of the auxiliary pump 242. The clutch 254 can include any type of clutch for engaging or for disengaging the pump shaft 250. The lubrication system 220 includes a lubricant pressure signal line 256 that is in fluid communication with the primary lubrication system 222 and the clutch 254. For example, the lubricant pressure signal line 256 is in fluid communication with the primary lubricant supply line 228. In this way, the clutch 254 engages or disengages the pump shaft 250 based on a pressure of the lubricant in the primary lubrication system 222, as detailed further below.

In operation, the lubrication system 220 supplies the lubricant to the one or more rotating components 210 to lubricate the one or more rotating components 210. During normal operation of the turbine engine 200, the primary lubrication system 222 supplies the lubricant to the one or more rotating components 210. For example, the primary pump 226 pumps the lubricant from the one or more tanks 224 to the one or more rotating components 210 through the primary lubricant supply line 228. During normal operation, the pressure of the lubricant in the primary lubrication system 222 causes the first valve 245 to open while causing the second valve 247 to close. For example, the first valve 245 opens based on the pressure in the primary lubrication system 222 being greater than a primary pressure threshold of the first valve 245. The first valve 245 closes based on the pressure in the primary lubrication system 222 being less than the primary pressure threshold of the first valve 245. Similarly, the second valve 247 opens based the pressure in the auxiliary lubrication system 240 being greater than an auxiliary pressure threshold, and closes based on the pressure in the auxiliary lubrication system 240 being less than the auxiliary pressure threshold. In this way, the primary lubrication system 222 supplies the lubricant, while the auxiliary lubrication system 240 is prevented from supplying the lubricant during the normal operation of the turbine engine 200. The lubricant drains from the one or more rotating components 210 into the sump 230 (as indicated by the arrow 231), and the lubricant is directed to the one or more tanks 224. In this way, the lubricant is re-circulated through the primary lubrication system 222.

The clutch 254 disengages the pump shaft 250 when the pressure in the primary lubrication system 222 is greater than the predetermined pressure threshold. For example, the clutch 254 receives a pressure signal from the primary lubrication system 222 through the lubricant pressure signal line 256. When the pressure in the primary lubrication system 222 is greater than the primary pressure threshold (e.g., during normal operation of the turbine engine 200), the pressure of the lubricant in the primary lubrication system 222 cause the clutch 254 to disengage the pump shaft 250 such that the auxiliary pump 242 is prevented from operating and prevented from pumping the lubricant from the one or more tanks 224.

In some instances, the primary lubrication system 222 may be unable to supply the lubricant to the one or more rotating components 210. For example, the primary lubrication system 222 may be unable to pressurize the lubricant to supply the lubricant to the one or more rotating components 210 during windmilling while the turbine engine 200 is shut down or during a failure of the turbine engine 200 or the lubrication system 220 (e.g., the primary pump 226 fails, the primary lubricant supply line 228 becomes damaged, etc.) while in-flight. In such instances, the windmilling may cause the shafts (e.g., the fan shaft 206) of the turbine engine 200 to rotate, thereby causing the one or more rotating components 210 of the turbine engine 200 to rotate. The one or more rotating components 210 can become damaged if there is not enough lubricant supplied to the one or more rotating components 210.

Accordingly, during such instances, the auxiliary lubrication system 240 supplies the lubricant to the one or more rotating components 210. When the pressure of the lubricant in the primary lubrication system 222 is less than the primary pressure threshold, the clutch 254 engages the pump shaft 250 such that rotation of the fan shaft 206 causes the pump shaft 250 to rotate. In this way, the auxiliary pump 242 pumps the lubricant from the one or more tanks 224 to the one or more rotating components 210 through the auxiliary lubricant supply line 244. When the pressure of the lubricant in the primary lubrication system 222 is less than the primary pressure threshold, the first valve 245 closes and the second valve 247 opens. Similarly, when the pressure of the lubricant in the auxiliary lubrication system 240 is greater than the auxiliary pressure threshold, the second valve 247 opens and the first valve 245 closes. In this way, the lubricant flows through the auxiliary lubricant supply line 244 to the one or more rotating components 210. The lubricant drains from the one or more rotating components 210 to the sump 230 and back to the one or more tanks 224, as detailed above. Thus, the auxiliary lubrication system 240 supplies the lubricant to the one or more rotating components 210 when the pressure of the lubricant in the primary lubrication system 222 is less than the primary pressure threshold, such as when the primary lubrication system 222 fails during operation of the turbine engine 200, when the fan 202 is windmilling during operation, or when the turbine engine 200 is shut down.

Figure 3:
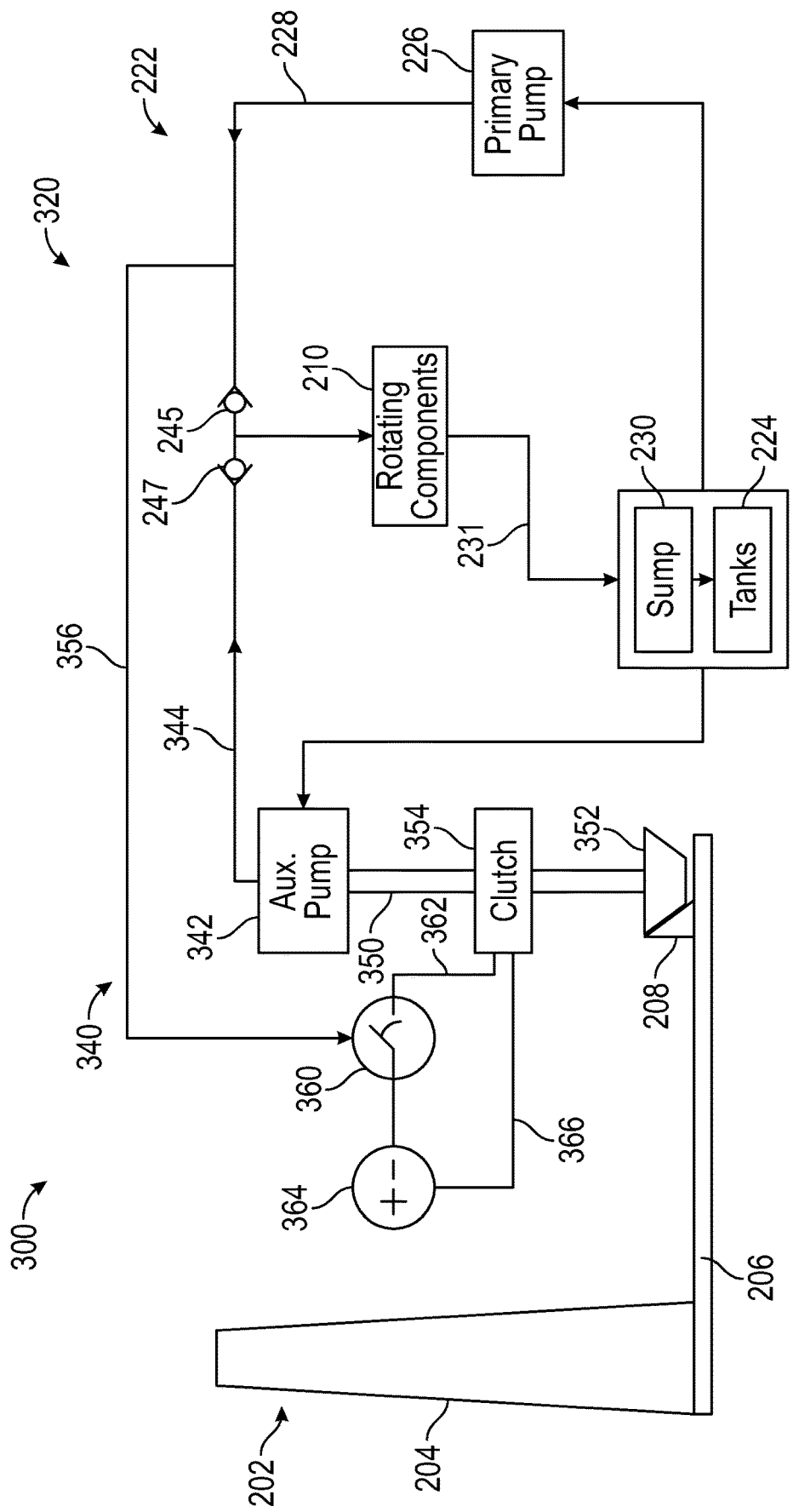
FIG. 3 is a schematic view of a turbine engine having a lubrication system, according to another embodiment.

FIG. 3 is a schematic view of a turbine engine 300 having a lubrication system 320, according to another embodiment. The turbine engine 300 can be utilized as the turbine engine 10 of FIG. 1. The turbine engine 300 and the lubrication system 320 include many of the same components or similar components as the turbine engine 200 and the lubrication system 220 of FIG. 2, respectively. The lubrication system 320, however, includes an auxiliary lubrication system 340 that is different than the auxiliary lubrication system 240 of FIG. 2.

The auxiliary lubrication system 340 includes an auxiliary (aux.) pump 342 and an auxiliary lubrication supply line 344. The auxiliary pump 342 is a bi-directional pump and includes a pump shaft 350 that is coupled to the fan shaft 206 via a pump shaft gear 352 that is intermeshed with the fan shaft gear 208. A clutch 354 engages or disengages the pump shaft 350 such that the auxiliary pump 342 operates or is prevented from operating, respectively. The clutch 354 is an electro-mechanical clutch that includes a lubricant pressure switch 360 and a power supply 364. The lubricant pressure switch 360 is in fluid communication with a lubricant pressure signal line 356 and is in communication with the clutch 354 (as indicated by line 362). The power supply 364 is in communication with the clutch 354 (as indicated by line 366). The power supply 364 can be electrical power from the turbine engine 300 (e.g., power that is supplied to the controller 102 of FIG. 1 or to other systems of the turbine engine 300).

The turbine engine 300 and the lubrication system 320 operate substantially similarly as do the turbine engine 200 and the lubrication system 220 of FIG. 2, respectively. The clutch 354, however, engages or disengages the pump shaft 350 based on the pressure of the lubricant in the primary lubrication system 222 and a supply of power from the power supply 364. For example, the clutch 354 engages the pump shaft 350 when the pressure of the lubricant in the primary lubrication system 222 is less than the primary pressure threshold (e.g., the lubricant pressure switch 360 opens) or the power supply 364 is off (e.g., the clutch 354 or the lubricant pressure switch 360 are not receiving electrical power from the power supply 364). In this way, the auxiliary lubrication system 340 supplies the lubricant from the one or more tanks 224 to the one or more rotating components 210 when either the pressure of the lubricant in the primary lubrication system 222 is less than the primary pressure threshold or the power supply 364 is off. The clutch 354 disengages the pump shaft 350 when the pressure of the lubricant in the primary lubrication system 222 is greater than the primary pressure threshold (e.g., the lubricant pressure switch 360 closes) and the power supply 364 is on (e.g., the clutch 354 or the lubricant pressure switch 360 are receiving electrical power from the power supply 364). In this way, the primary lubrication system 222 supplies the lubricant from the one or more tanks 224 to the one or more rotating components 210.

Figure 4:
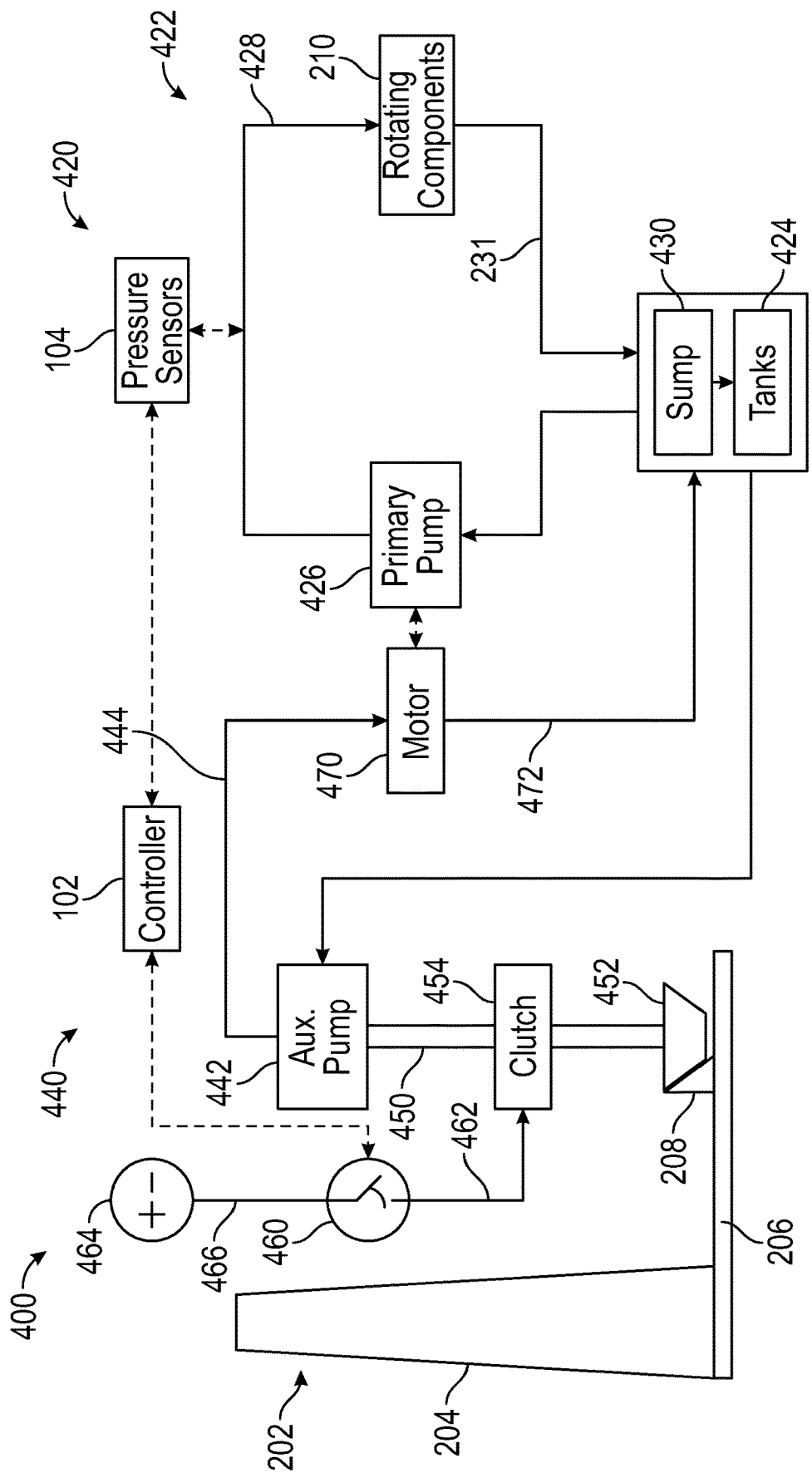
FIG. 4 is a schematic view of a turbine engine having a lubrication system, according to another embodiment.

FIG. 4 is a schematic view of a turbine engine 400 having a lubrication system 420, according to another embodiment. The turbine engine 400 can be utilized as the turbine engine 10 of FIG. 1. The turbine engine 400 and the lubrication system 420 include many of the same components or similar components as the turbine engine 200 and the lubrication system 220 of FIG. 2, respectively. The lubrication system 420 includes a primary lubrication system 422, one or more tanks 424, a sump 430, and an auxiliary lubrication system 440. The primary lubrication system 422 includes a primary pump 426 and a primary lubricant supply line 428. The primary pump 426 is powered by a motor 470, as detailed further below.

The auxiliary lubrication system 440 includes an auxiliary (aux.) pump 442 and an auxiliary lubricant supply line 444. The auxiliary pump 442 is a bi-directional pump and includes a pump shaft 450 that is coupled to the fan shaft 206 via a pump shaft gear 452 that is intermeshed with the fan shaft gear 208. A clutch 454 engages or disengages the pump shaft 450 such that the auxiliary pump 442 operates or is prevented from operating, respectively. The clutch 454 is an electro-mechanical clutch that includes a lubricant pressure switch 460 and a power supply 464. The lubricant pressure switch 460 is in communication with the controller 102 and is in communication with the clutch 454 (as indicated by line 462). The power supply 464 is in communication with the lubricant pressure switch 460 (as indicated by line 466). The controller 102 is in communication with one or more pressure sensors 104 that sense a pressure of the lubricant in the primary lubrication system 422. For example, the one or more pressure sensors 104 sense the pressure of the lubricant in the primary lubricant supply line 428. The one or more pressure sensors 104 can include any type of pressure sensor for sensing the pressure of the lubricant in the primary lubrication system 422.

The auxiliary lubricant supply line 444 is in fluid communication with the auxiliary pump 442 and the motor 470. The motor 470 is coupled to the primary pump 426 and powers the primary pump 426, as detailed further below.

The turbine engine 400 and the lubrication system 420 operate substantially similarly as do the turbine engine 200 and the lubrication system 220 of FIG. 2, respectively. During normal operation of the turbine engine 400, the primary lubrication system 422 operates as detailed above with respect to the primary lubrication system 222 of FIG. 2. During the normal operation of the turbine engine 400, the primary pump 426 is powered by an electric motor, an accessory gearbox, a turbine section of the turbine engine 400 (e.g., the turbine section 27 of FIG. 1), or the like.

The clutch 454 engages or disengages the pump shaft 450 based on the pressure of the lubricant in the primary lubrication system 422 and a supply of power from the power supply 464. For example, the controller 102 receives sensed pressure of the lubricant in the primary lubrication system 422 from the one or more pressure sensors 104. During the normal operation of the turbine engine 400, the primary lubrication system 422 supplies the lubricant to the one or more rotating components 210. For example, the clutch 454 disengages the pump shaft 450 when the pressure of the lubricant in the primary lubrication system 422 is greater than the primary pressure threshold (e.g., the controller 102 controls the lubricant pressure switch 460 to close) and the power supply 464 is on (e.g., the lubricant pressure switch 460 is receiving electrical power from the power supply 464). In this way, the primary lubrication system 422 supplies the lubricant from the one or more tanks 424 to the one or more rotating components 210.

During instances when the primary lubrication system 422 is unable to supply the lubricant to the one or more rotating components 210 under the normal operation of the turbine engine 400 (e.g., the fan 202 is windmilling), the auxiliary lubrication system 440 powers the primary pump 426 to supply the lubricant to the one or more rotating components 210. For example, the clutch 454 engages the pump shaft 450 when the pressure of the lubricant in the primary lubrication system 422 is less than the primary pressure threshold (e.g., the controller 102 controls the lubricant pressure switch 460 to open), the power supply 464 is off (e.g., the lubricant pressure switch is not receiving electrical power from the power supply 464), or the lubricant pressure switch 460 does not receive a signal from the controller 102. In this way, the auxiliary lubrication system 440 supplies the lubricant from the one or more tanks 424 to the motor 470 through the auxiliary lubricant supply line 444 when the pressure of the lubricant in the primary lubrication system 422 is less than the primary pressure threshold, the power supply 464 is off, or the lubricant pressure switch 460 is not receiving a signal from the controller 102. For example, the motor 470 is a hydraulic motor and is powered by the lubricant flowing through the motor 470 from the auxiliary lubricant supply line 444. The lubricant then flows from the motor 470 to the sump 430 or the one or more tanks 424 (as indicated by the arrow 472). In this way, the auxiliary lubrication system 440 powers the motor 470, and the motor 470 powers the primary pump 426 to pump the lubricant from the one or more tanks 424 to the one or more rotating components 210 through the primary lubricant supply line 428.

Figure 5:
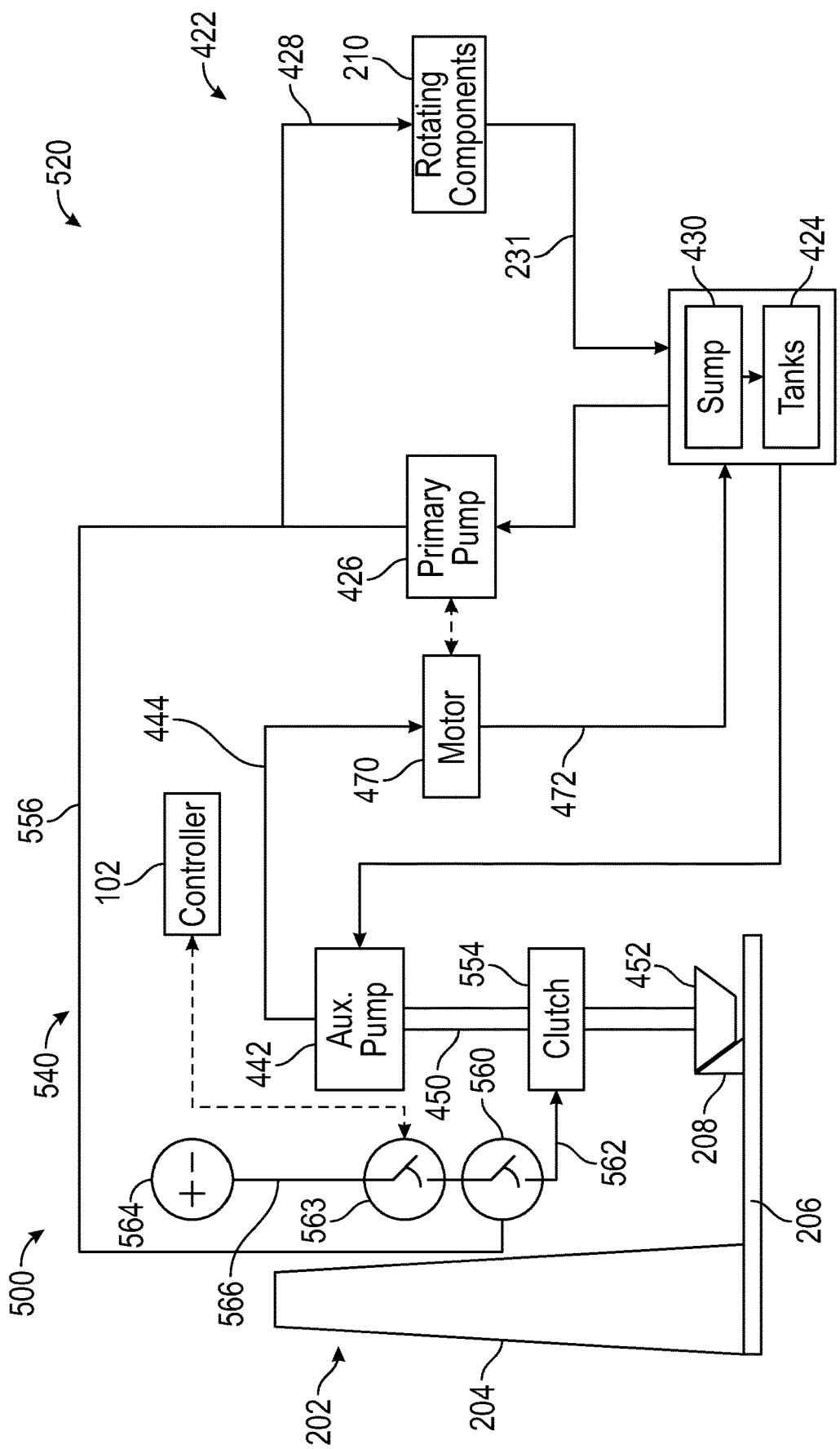
FIG. 5 is a schematic view of a turbine engine having a lubrication system, according to another embodiment.

FIG. 5 is a schematic view of a turbine engine 500 having a lubrication system 520, according to another embodiment. The turbine engine 500 can be utilized as the turbine engine 10 of FIG. 1. The turbine engine 500 and the lubrication system 520 include many of the same components or similar components as the turbine engine 400 and the lubrication system 420 of FIG. 4, respectively. The lubrication system 520, however, includes an auxiliary lubrication system 540 that is different than the auxiliary lubrication system 440 of FIG. 4.

In particular, the auxiliary lubrication system 540 includes a clutch 554 that is controlled by a lubricant pressure switch 560, a control signal switch 563, and a power supply 564. The lubricant pressure switch 560 and the control signal switch 563 are in communication with the clutch 554 (as indicated by arrow 562), and the power supply 564 is in communication with the lubricant pressure switch 560 and the control signal switch 563 (as indicated by line 566). The lubricant pressure switch 560 is in fluid communication with the primary lubrication system 422 through a lubricant pressure signal line 556. The control signal switch 563 is in communication with the controller 102 such that the control signal switch 563 receives a signal from the controller 102.

The turbine engine 500 and the lubrication system 520 operate substantially similarly as do the turbine engine 400 and the lubrication system 420 of FIG. 4, respectively. The clutch 554, however, engages or disengages the pump shaft 450 based on the pressure of the lubricant in the primary lubrication system 422, the signal from the controller 102, and a supply of power from the power supply 564. For example, the clutch 554 engages the pump shaft 450 when the pressure of the lubricant in the primary lubrication system 422 is less than the primary pressure threshold (e.g., the lubricant pressure switch 560 opens), the control signal switch 563 does not receive the signal from the controller 102, or the power supply 564 is off. In this way, the auxiliary lubrication system 540 supplies the lubricant from the one or more tanks 424 to motor 470 when the pressure of the lubricant in the primary lubrication system 422 is less than the primary pressure threshold (e.g., the lubricant pressure switch 560 opens), the controller 102 is offline (e.g., the control signal switch 563 opens), or the power supply 564 is off.

The clutch 554 disengages the pump shaft 450 when the pressure of the lubricant in the primary lubrication system 422 is greater than the primary pressure threshold (e.g., the lubricant pressure switch 560 closes), the controller 102 is online and sends the signal to the control signal switch 563 (e.g., the control signal switch 563 closes), and the power supply 564 is on (e.g., the clutch 554, the lubricant pressure switch 560, or the control signal switch 563 are receiving electrical power from the power supply 564). In this way, the primary lubrication system 422 supplies the lubricant from the one or more tanks 424 to the one or more rotating components 210 during the normal operation of the turbine engine 500.

Figure 6:
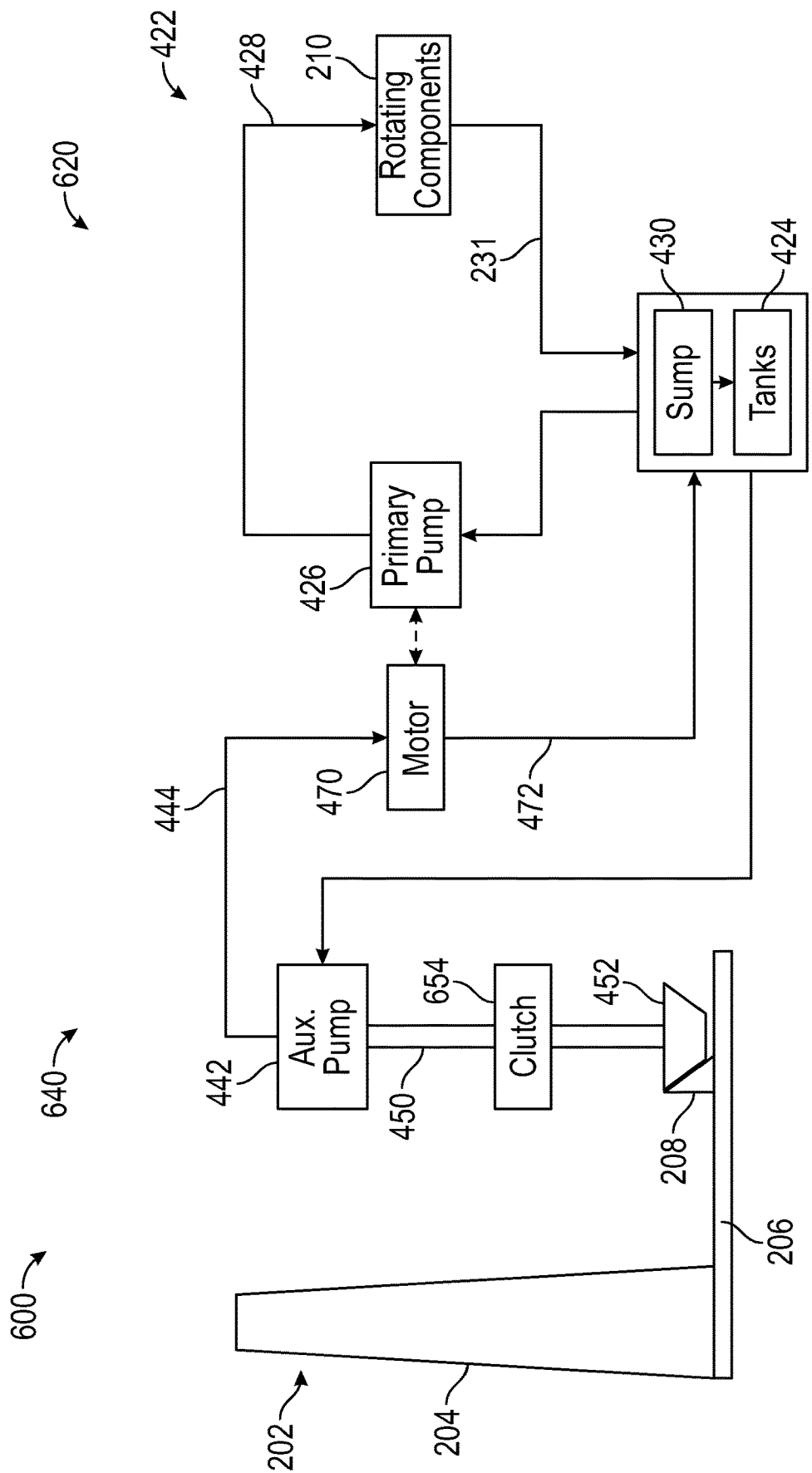
FIG. 6 is a schematic view of a turbine engine having a lubrication system, according to another embodiment.

FIG. 6 is a schematic view of a turbine engine 600 having a lubrication system 620, according to another embodiment. The turbine engine 600 can be utilized as the turbine engine 10 of FIG. 1. The turbine engine 600 and the lubrication system 620 include many of the same components or similar components as the turbine engine 400 and the lubrication system 420 of FIG. 4, respectively. The lubrication system 620, however, includes an auxiliary lubrication system 640 that is different than the auxiliary lubrication system 440 of FIG. 4.

In particular, the auxiliary lubrication system 640 includes a clutch 654 that is different than the clutch 454 of FIG. 4. The clutch 654 is a centrifugal clutch that engages or disengages the pump shaft 450 based on a rotational speed of the fan 202 (e.g., of the fan shaft 206). The turbine engine 600 and the lubrication system 620 operate substantially similarly as do the turbine engine 400 and the lubrication system 420 of FIG. 4, respectively. The clutch 654, however, engages the pump shaft 450 when the rotational speed of the fan 202 is less than a fan speed threshold. The clutch 654 disengages the pump shaft 450 when the rotational speed of the fan 202 is greater than the fan speed threshold.

Figure 7:
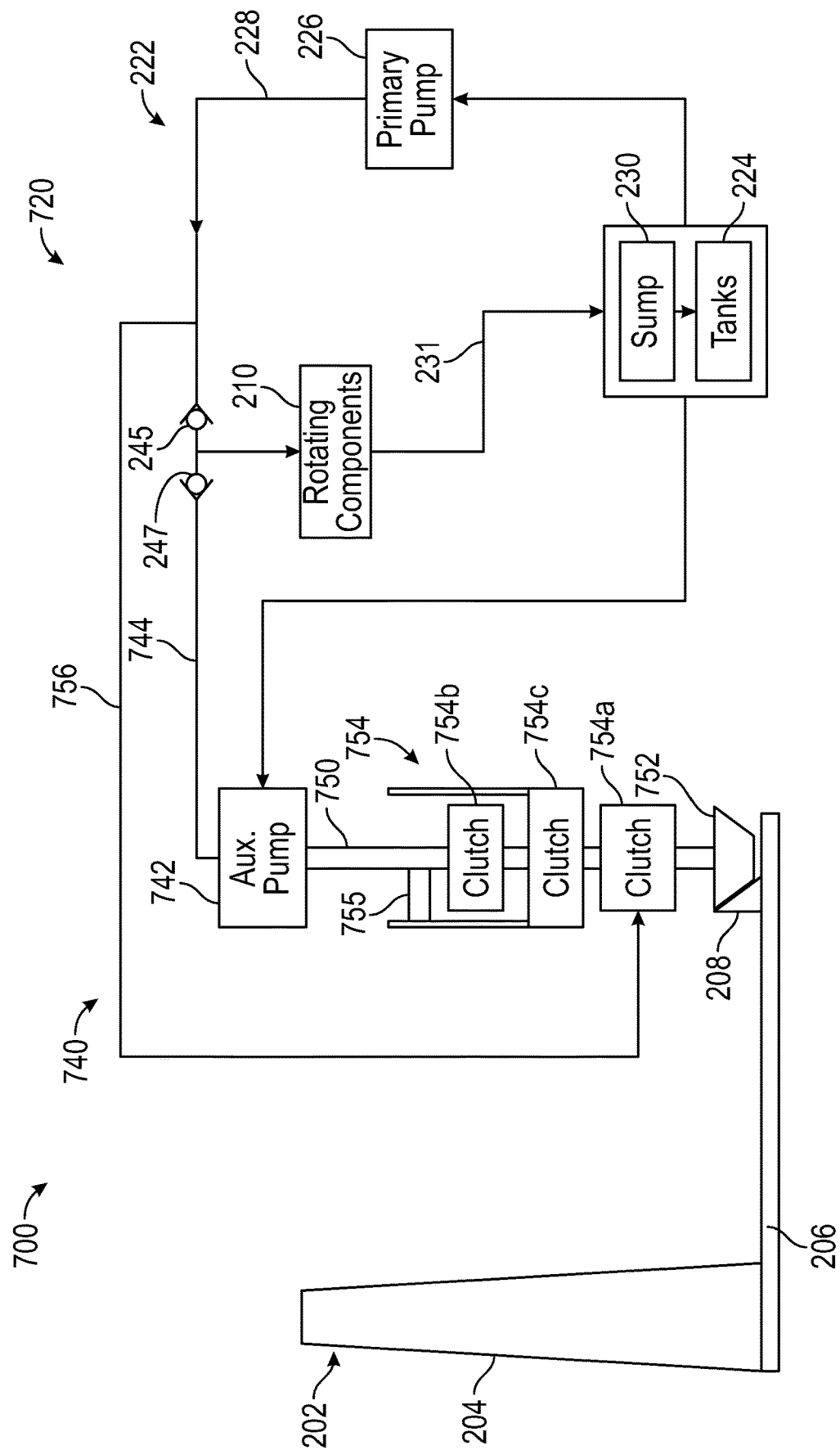
FIG. 7 is a schematic view of a turbine engine having a lubrication system, according to another embodiment.

FIG. 7 is a schematic view of a turbine engine 700 having a lubrication system 720, according to another embodiment. The turbine engine 700 can be utilized as the turbine engine 10 of FIG. 1. The turbine engine 700 and the lubrication system 720 include many of the same components or similar components as the turbine engine 200 and the lubrication system 220 of FIG. 2, respectively. The lubrication system 720, however, includes an auxiliary lubrication system 740 that is different than the auxiliary lubrication system 240 of FIG. 2.

The auxiliary lubrication system 740 includes an auxiliary (aux.) pump 742, an auxiliary lubrication supply line 744, a pump shaft 750, a pump shaft gear 752, a plurality of clutches 754, and a lubricant pressure signal line 756. The auxiliary pump 742 is a uni-directional pump that operates in a single rotational direction to pump the lubricant from the one or more tanks 224.

The plurality of clutches 754 converts the bi-directional rotation of the fan 202 (e.g., the fan shaft 206) to a single rotational direction for operating the auxiliary pump 742 in a single rotational direction. The plurality of clutches 754 includes a first clutch 754a, a second clutch 754b, and a third clutch 754c. The first clutch 754a is in fluid communication with the primary lubrication system 222 through the lubricant pressure signal line 756. In this way, the first clutch 754a engages or disengages the pump shaft 750 based on the pressure in the primary lubrication system 222. The second clutch 754b and the third clutch 754c are sprag clutches. In this way, the second clutch 754b and the third clutch 754c are one-way clutches. The second clutch 754b operates in a first clutch rotational direction and the third clutch 754c operates in a second clutch rotational direction that is opposite the first clutch rotational direction. The first clutch rotational direction is the same direction as an operational rotational direction of the pump shaft 750 for operating the auxiliary pump 742. The third clutch 754c is coupled to a reversing gear 755 that rotates in a direction that is opposite of the second clutch rotational direction. In this way, the pump shaft 750 rotates in the operational rotational direction when the second clutch 754b engages the pump shaft 750 and when the third clutch 754c engages the pump shaft 750.

The turbine engine 700 and the lubrication system 720 operate substantially similarly as do the turbine engine 200 and the lubrication system 220 of FIG. 2, respectively. The first clutch 754a engages the pump shaft 750 when the pressure of the lubricant in the primary lubrication system 222 is less than the lubricant pressure threshold. If the fan 202 (e.g., the fan shaft 206) is rotating in a first fan rotational direction that is the same as the operational rotational direction of the pump shaft 750, the second clutch 754b engages the pump shaft 750 to operate the auxiliary pump 742. If the fan 202 (e.g., the fan shaft 206) is rotating in a second fan rotational direction that is different from the operational direction of the pump shaft 750, the third clutch 754c engages the pump shaft 750 and the reversing gear 755 converts the rotational direction to the operational direction of the pump shaft 750. In this way, the auxiliary pump 742 operates in a single rotational direction regardless of the fan rotational direction of the fan 202.

Figure 8:
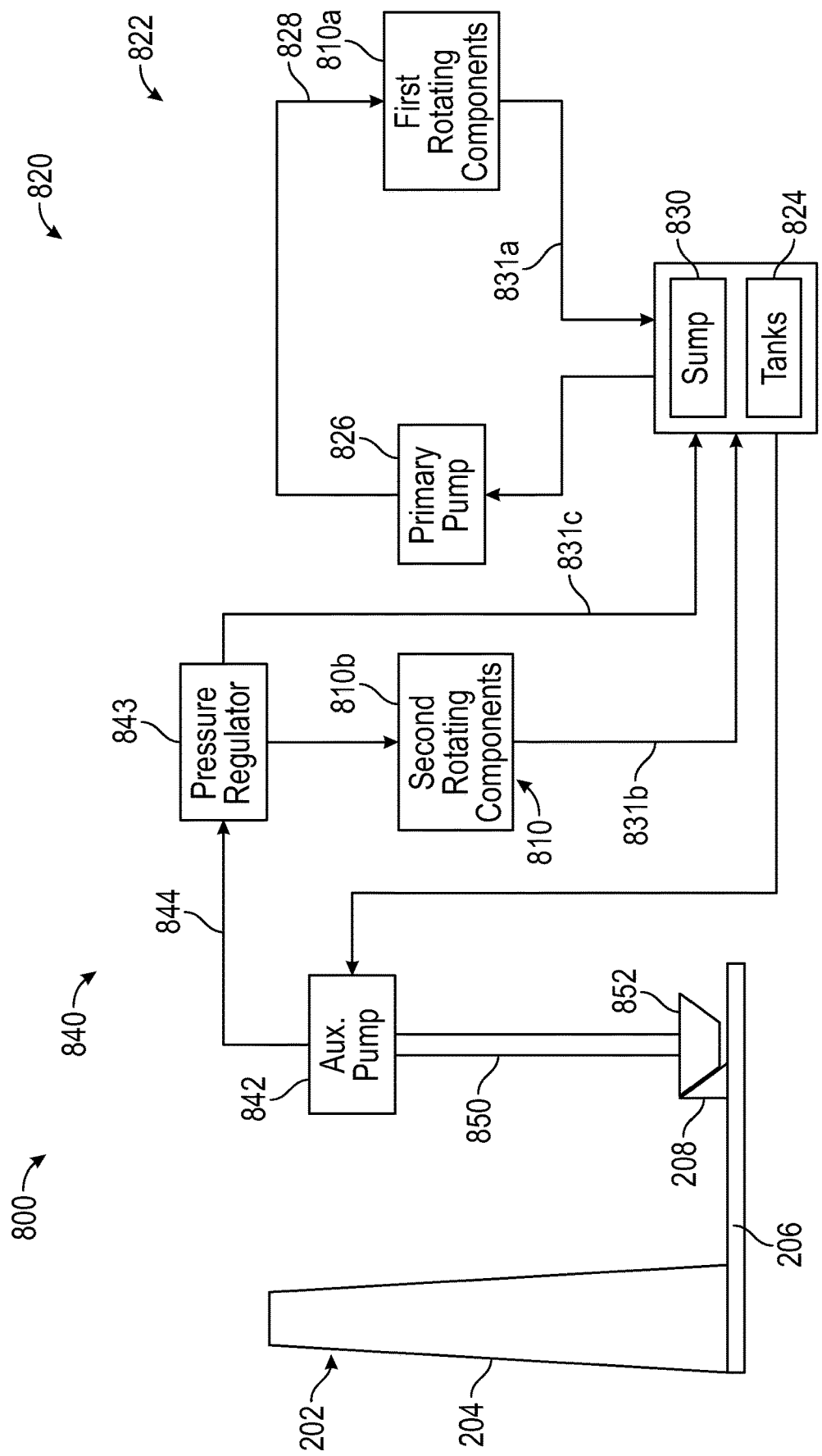
FIG. 8 is a schematic view of a turbine engine having a lubrication system, according to another embodiment.

FIG. 8 is a schematic view of a turbine engine 800 having a lubrication system 820, according to another embodiment. The turbine engine 800 can be utilized as the turbine engine 10 of FIG. 1. The turbine engine 800 and the lubrication system 820 include many of the same components or similar components as the turbine engine 200 and the lubrication system 220 of FIG. 2, respectively. The turbine engine 800 includes one or more rotating components 810 including one or more first rotating components 810a and one or more second rotating components 810b. The one or more first rotating components 810a can be utilized as the one or more engine bearings 37 and the one or more second rotating components 810b can be utilized as the one or more gearbox bearings 48 of FIG. 1. The one or more first rotating components 810a and the one or more second rotating components 810b can be any of the rotating components of the turbine engine 800.

The lubrication system 820 includes a primary lubrication system 822, one or more tanks 824, a sump 830, and an auxiliary lubrication system 840. The primary lubrication system 822 includes a primary pump 826 and a primary lubricant supply line 828. The primary lubricant supply line 828 is in fluid communication with the one or more tanks 824 and the one or more first rotating components 810a. The auxiliary lubrication system 840 includes an auxiliary (aux.) pump 842 and an auxiliary lubricant supply line 844. The auxiliary pump 842 is a bi-directional pump and includes a pump shaft 850 that is coupled to the fan shaft 206 via a pump shaft gear 852 that is intermeshed with the fan shaft gear 208. The auxiliary lubrication system 840 does not include a clutch.

The auxiliary lubrication system 840 supplies the lubricant from the one or more tanks 824 to the one or more second rotating components 810b during normal operation of the turbine engine 800 and during windmilling of the fan 202. The auxiliary lubricant supply line 844 is in fluid communication with the one or more tanks 824 and the one or more second rotating components 810b. The auxiliary lubrication system 840 includes a pressure regulator 843 that maintains a pressure of the lubricant to the one or more second rotating components 810b below a maximum lubricant pressure threshold, as detailed further below.

The turbine engine 800 and the lubrication system 820 operate substantially similarly as do the turbine engine 200 and the lubrication system 220 of FIG. 2, respectively. The primary lubrication system 822 supplies the lubricant to the one or more first rotating components 810a during normal operation of the turbine engine 800. For example, the primary pump 826 pumps the lubricant from the one or more tanks 824 to the one or more first rotating components 810a through the primary lubricant supply line 828. The lubricant drains from the one or more first rotating components 810a to the sump 830 (as indicated by arrow 831a).

The auxiliary lubrication system 840 supplies the lubricant to the one or more second rotating components 810b. For example, the auxiliary pump 842 pumps the lubricant from the one or more tanks 824 to the one or more second rotating components 810b through the auxiliary lubricant supply line 844. The lubricant drains from the one or more second rotating components 810b to the sump 830 (as indicated by arrow 831b). During normal operation of the turbine engine 800, the pressure regulator 843 ensures the pressure of the lubricant to the one or more second rotating components 810b does not exceed the maximum pressure threshold. For example, during normal operation of the turbine engine 800, the fan 202 (e.g., the fan shaft 206) rotates at a high fan speed, thereby causing the auxiliary pump 842 to rotate at a high pump speed. Thus, the pressure regulator 843 directs a portion of the lubricant to bypass the one or more second rotating components 810b to the sump 830 or the one or more tanks 824 (as indicated by arrow 831c). During windmilling, when the fan 202 rotates at a low fan speed, the auxiliary pump 842 rotates at a low pump speed. In such instances, the pressure regulator 843 directs substantially all the lubricant in the auxiliary lubricant supply line 844 to the one or more second rotating components 810b. Accordingly, the auxiliary lubrication system 840 supplies the lubricant from the one or more tanks 824 to the one or more second rotating components 810b during normal operation of the turbine engine 800 and during windmilling of the fan 202.

Figure 9:
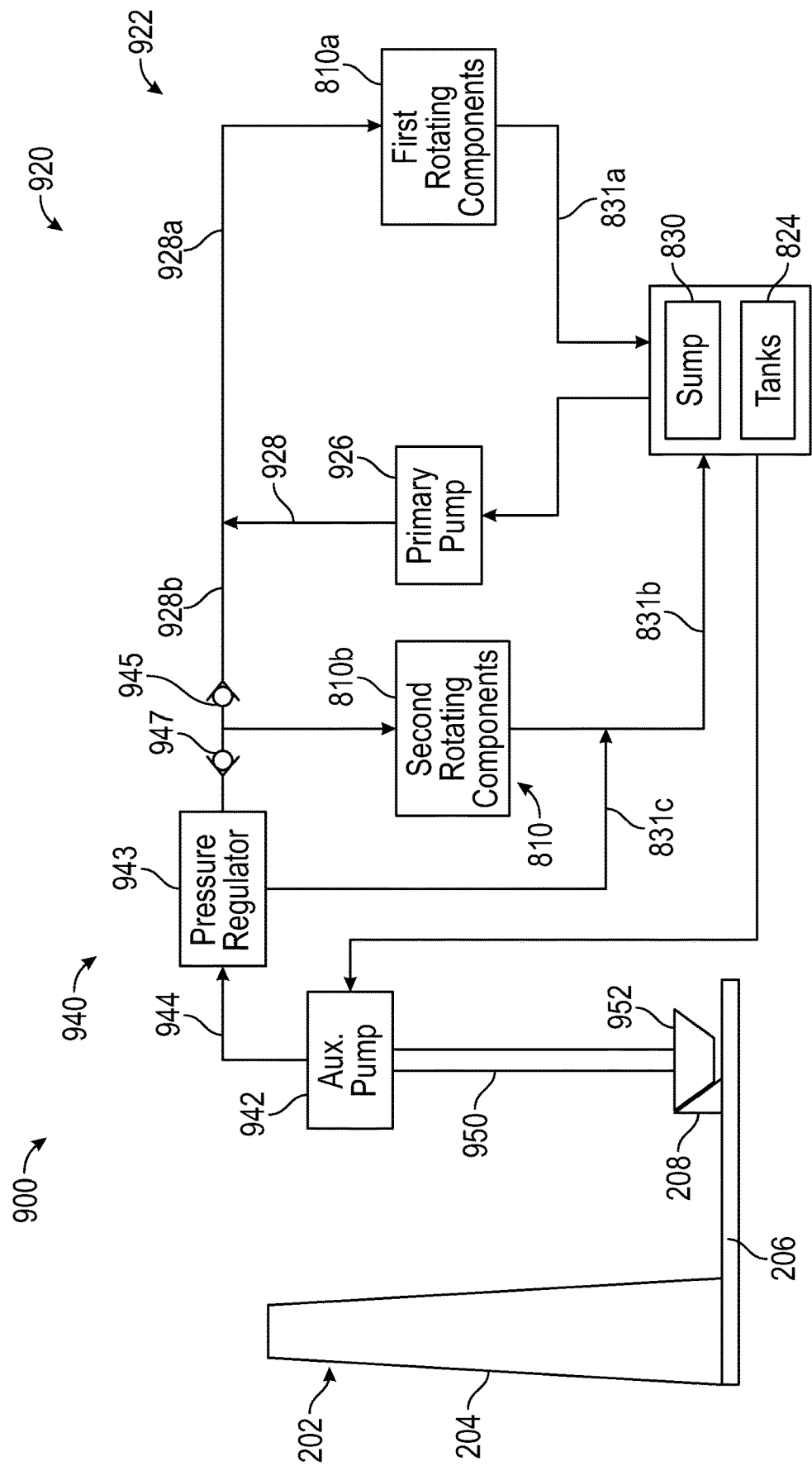
FIG. 9 is a schematic view of a turbine engine having a lubrication system, according to another embodiment.

FIG. 9 is a schematic view of a turbine engine 900 having a lubrication system 920, according to another embodiment. The turbine engine 900 can be utilized as the turbine engine 10 of FIG. 1. The turbine engine 900 and the lubrication system 920 include many of the same components or similar components as the turbine engine 800 and the lubrication system 820 of FIG. 8, respectively.

The lubrication system 920 includes a primary lubrication system 922 and an auxiliary lubrication system 940. The primary lubrication system 922 includes a primary pump 926 and a primary lubricant supply line 928. The primary lubricant supply line 928 includes a first primary lubricant supply line 928a and a second primary lubricant supply line 928b. The first primary lubricant supply line 928a is in fluid communication with the one or more tanks 824 and the one or more first rotating components 810a. The second primary lubricant supply line 928b is in fluid communication with the one or more tanks 824 and the one or more second rotating components 810b.

The auxiliary lubrication system 940 includes an auxiliary (aux.) pump 942, an auxiliary lubricant supply line 944, and a pressure regulator 943. The auxiliary pump 942 is a bi-directional pump and includes a pump shaft 950 that is coupled to the fan shaft 206 via a pump shaft gear 952 that is intermeshed with the fan shaft gear 208. The auxiliary lubrication system 840 does not include a clutch. The auxiliary lubricant supply line 944 is in fluid communication with the one or more tanks 824 and the one or more second rotating components 810b. The lubrication system 920 also includes one or more valves 945, 947 including a first valve 945 and a second valve 947. The one or more valves 945, 947 are substantially similar as the one or more valves 245, 247 of FIG. 2.

The turbine engine 900 and the lubrication system 920 operate substantially similarly as do the turbine engine 800 and the lubrication system 820 of FIG. 8, respectively. During normal operation of the turbine engine 900, the primary lubrication system 922 supplies the lubricant from the one or more tanks 824 to the one or more first rotating components 810a and the one or more second rotating components 810b. For example, the primary pump 926 pumps the lubricant from the one or more tanks 824 to the one or more first rotating components 810a through the first primary lubricant supply line 928a. The primary pump 926 pumps the lubricant from the one or more tanks 824 to the one or more second rotating components 810b through the second primary lubricant supply line 928b. During normal operation of the turbine engine 900, the pressure of the lubricant in the primary lubrication system 922 opens the first valve 945 and closes the second valve 947 such that the lubricant flows to the one or more second rotating components 810b.

When the turbine engine 900 is not operating under normal operation (e.g., during windmilling or when the lubricant in the primary lubrication system 922 is less than the lubricant pressure threshold), the auxiliary lubrication system 940 supplies the lubricant from the one or more tanks 824 to the one or more second rotating components 810b. For example, the auxiliary pump 942 pumps the lubricant from the one or more tanks 824 and the pressure of the lubricant in the auxiliary lubricant supply line 944 causes the second valve 947 to open and the first valve 945 to close. In this way, the lubricant flows to the one or more second rotating components 810b through the auxiliary lubricant supply line 944.

Figure 10:
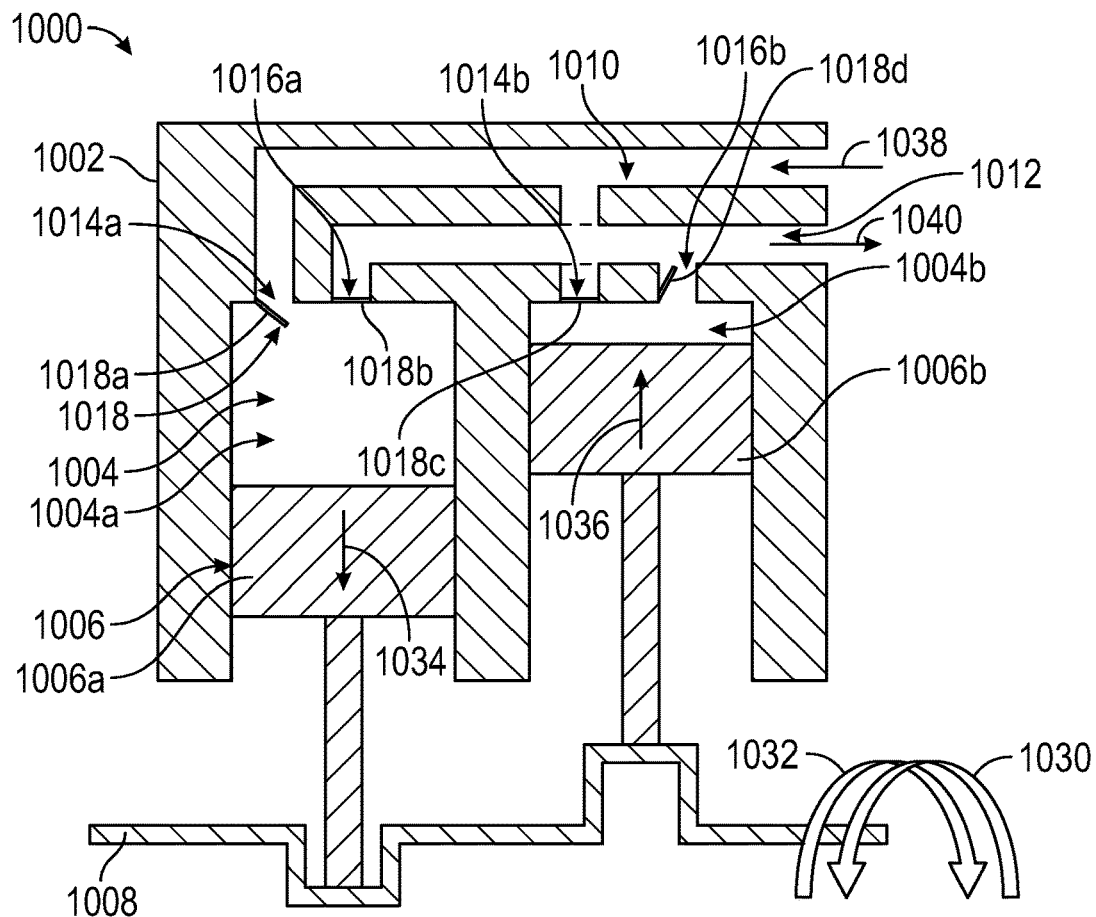
FIG. 10 is a schematic cross-sectional view of a bi-directional pump for a turbine engine, taken at a longitudinal centerline axis of the turbine engine, according to the present disclosure.

FIG. 10 is a schematic cross-sectional view of a bi-directional pump 1000 for a turbine engine, taken at a longitudinal centerline axis of the turbine engine, according to the present disclosure. The bi-directional pump 1000 can be utilized as any of the bi-directional pumps detailed herein.

The bi-directional pump 1000 includes a pump housing 1002 having a plurality of hollow interiors 1004, a plurality of pistons 1006, and a pump shaft 1008. The plurality of hollow interiors 1004 includes a first hollow interior 1004a and a second hollow interior 1004b. The plurality of pistons 1006 includes a first piston 1006a that is disposed in the first hollow interior 1004a, and a second piston 1006b that is disposed in the second hollow interior 1004b. The plurality of pistons 1006 is coupled to the pump shaft 1008. The pump shaft 1008 can be utilized as any of the pump shafts detailed herein. The plurality of pistons 1006 is coupled to the pump shaft 1008 such that the first piston 1006a is 180° out-of-phase with the second piston 1006b, as detailed further below. While the bi-directional pump 1000 includes two pistons 1006, the bi-directional pump 1000 can include any number of pistons 1006 of at least two or more. For example, the plurality of pistons 1006 can include three pistons that are 120° out-of-phase, four pistons that are 90° out-of-phase, or any number of pistons 1006 of at least two or more. Increasing the number of pistons 1006 reduces a pump output ripple as the pistons pump the lubricant, but also increases a weight and a complexity of the bi-directional pump 1000.

The bi-directional pump 1000 includes an input flowpath 1010 and an output flowpath 1012. The input flowpath 1010 is in fluid communication with the first hollow interior 1004a and the second hollow interior 1004b. For example, the input flowpath 1010 includes a first inlet 1014a in fluid communication with the first hollow interior 1004a, and a second inlet 1014b in fluid communication with the second hollow interior 1004b. The output flowpath 1012 is in fluid communication with the first hollow interior 1004a and the second hollow interior 1004b. For example, the output flowpath 1012 includes a first outlet 1016a in fluid communication with the first hollow interior 1004a, and a second outlet 1016b in fluid communication with the second hollow interior 1004b.

The bi-directional pump 1000 includes a plurality of pump valves 1018. The plurality of pump valves 1018 are flapper valves, but can include any type of valve, such as, for example, check valves, or the like. The plurality of pump valves 1018 includes a first pump valve 1018a, a second pump valve 1018b, a third pump valve 1018c, and a fourth pump valve 1018d. The first pump valve 1018a is in fluid communication with the first inlet 1014a, the second pump valve 1018b is in fluid communication with the first outlet 1016a, the third pump valve 1018c is in fluid communication with the second inlet 1014b, and the fourth pump valve 1018d is in fluid communication with the second outlet 1016b.

In operation, the pump shaft 1008 rotates in a first pump rotational direction 1030. The first pump rotational direction 1030 corresponds to the fan rotational direction during operation of the turbine engine (e.g., any of the turbine engines detailed herein). The pump shaft 1008 can also rotate in a second pump rotational direction 1032. The second pump rotational direction 1032 is opposite the first pump rotational direction 1030. During windmilling, the pump shaft 1008 can rotate in either the first pump rotational direction 1030 or the second pump rotational direction 1032. As the pump shaft 1008 rotates, the plurality of pistons 1006 moves down (as indicated by arrow 1034) to draw the lubricant into the corresponding hollow interior 1004 from the input flowpath 1010, and moves up (as indicated by arrow 1036) to push the lubricant out of the hollow interior 1004 through the output flowpath 1012 and out of the bi-directional pump 1000. For example, as the pump shaft 1008 rotates, the first piston 1006a moves down, thereby causing the first pump valve 1018a to open and the second pump valve 1018b to close. In this way, the lubricant flows into the first hollow interior 1004a from the input flowpath 1010 (as indicated by arrow 1038) and through the first inlet 1014a, and the second pump valve 1018b prevents the lubricant from flowing through the first outlet 1016a into the output flowpath 1012. At the same time, the second piston 1006b moves up, thereby causing the third pump valve 1018c to close and the fourth pump valve 1018d to open. In this way, the lubricant flow out of the second hollow interior 1004b into the output flowpath 1012 through the second outlet 1016b (as indicated by arrow 1040), and the third pump valve 1018c prevents the lubricant from flowing through the second inlet 1014b into the input flowpath 1010.

As the pump shaft 1008 continues to rotate, the first piston 1006a moves up and the second piston 1006b moves down. The first piston 1006a moving up causes the first pump valve 1018a to close and the second pump valve 1018b to open. In this way, the lubricant flows out of the first hollow interior 1004a into the output flowpath 1012 through the first outlet 1016a, and the first pump valve 1018a prevents the lubricant from flowing through the first inlet 1014a into the input flowpath 1010. The second piston 1006b moving down causes the third pump valve 1018c to open and the fourth pump valve 1018d to close. In this way, the lubricant flows into the second hollow interior 1004b from the input flowpath 1010 through the second inlet 1014b, and the fourth pump valve 1018d prevents the lubricant from flowing through the second outlet 1016b into the output flowpath 1012. Accordingly, the bi-directional pump 1000 pumps the lubricant whether the pump shaft 1008 is rotating in the first pump rotational direction 1030 or the second pump rotational direction 1032.

Figure 11:
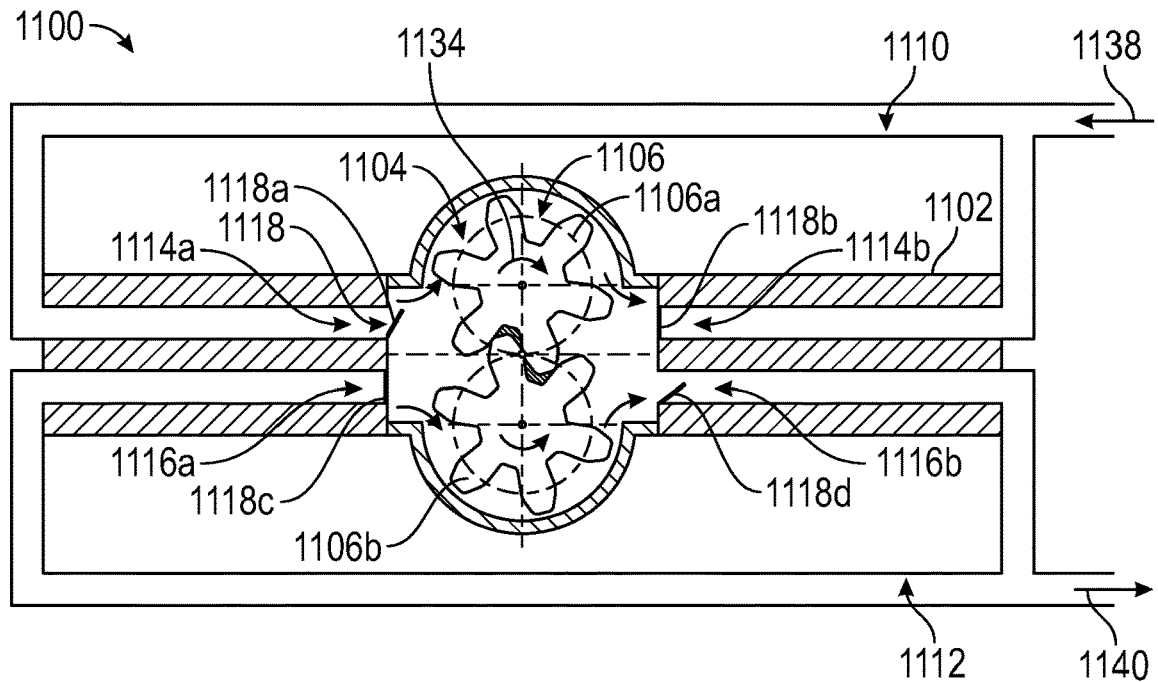
FIG. 11 is a schematic cross-sectional view of a bi-directional pump for a turbine engine, taken at a longitudinal centerline axis of the turbine engine, according to another embodiment.

FIG. 11 is a schematic cross-sectional view of a bi-directional pump 1100 for a turbine engine, taken at a longitudinal centerline axis of the turbine engine, according to another embodiment. The bi-directional pump 1100 can be utilized as any of the bi-directional pumps detailed herein. The bi-directional pump 1100 includes a pump housing 1102 having a hollow interior 1104, and a plurality of gears 1106. The bi-directional pump 1100 includes a pump shaft that is coupled to the plurality of gears 1106 and is not shown in the view of FIG. 11. The pump shaft of the bi-directional pump 1100 can be any of the pump shafts detailed herein.

The plurality of gears 1106 includes a first gear 1106a and a second gear 1106b that are disposed in the hollow interior 1104. While the bi-directional pump 1100 includes two gears 1106, the bi-directional pump 1100 can include any number of gears 1106 of at least two or more.

The bi-directional pump 1100 includes an input flowpath 1110 and an output flowpath 1112. The input flowpath 1110 and the output flowpath 1112 are in fluid communication with the hollow interior 1104. For example, the input flowpath 1110 includes a first inlet 1114a in fluid communication with the hollow interior 1104 and disposed at a first axial side of the hollow interior 1104, and a second inlet 1114b in fluid communication with the hollow interior 1104 and disposed at a second axial side of the hollow interior 1104. The output flowpath 1112 includes a first outlet 1116a in fluid communication with the hollow interior 1104 and disposed at the first axial side of the hollow interior 1104, and a second outlet 1116b in fluid communication with the hollow interior 1104 and disposed at the second axial side of the hollow interior 1104.

The bi-directional pump 1100 includes a plurality of pump valves 1118. The plurality of pump valves 1118 are flapper valves, but can include any type of valve, such as, for example, check valves, or the like. The plurality of pump valves 1118 includes a first pump valve 1118a, a second pump valve 1118b, a third pump valve 1118c, and a fourth pump valve 1118d. The first pump valve 1118a is in fluid communication with the first inlet 1114a, the second pump valve 1118b is in fluid communication with the first outlet 1116a, the third pump valve 1118c is in fluid communication with the second inlet 1114b, and the fourth pump valve 1118d is in fluid communication with the second outlet 1116b.

In operation, the pump shaft rotates in a first pump rotational direction and a second pump rotational direction, as detailed above. The first pump rotational direction 1030 corresponds to the fan rotational direction during operation of the turbine engine (e.g., any of the turbine engines detailed herein). As the pump shaft rotates (e.g., in either direction), the plurality of gears 1106 rotate in a first gear rotational direction 1134 to draw the lubricant from the input flowpath 1110 and into the hollow interior 1104 (as indicated by arrow 1138), and out of the hollow interior 1104 into the output flowpath 1112 (as indicated by arrow 1140). For example, as the pump shaft rotates, the rotation of the plurality of gears 1106 in the first gear rotational direction 1134 causes the first pump valve 1118a to open and the second pump valve 1118b to close. In this way, the lubricant flows into the hollow interior 1104 from the input flowpath 1110 and through the first inlet 1114a, and the second pump valve 1118b prevents the lubricant from flowing through the second inlet 1114b back into the input flowpath 1110. At the same time, the third pump valve 1118c closes and the fourth pump valve 1118d opens. In this way, the lubricant flows out of the hollow interior 1104 into the output flowpath 1112 through the second outlet 1116b, and the third pump valve 1018c prevents the lubricant from flowing through the first outlet 1016a.

The plurality of gears 1106 rotates in a second gear rotational direction (not depicted in FIG. 11) when the pump shaft rotates in the second pump rotational direction. The second gear rotational direction is opposite the first gear rotational direction 1134. The plurality of gears 1106 rotating in the second gear rotational direction causes the first pump valve 1118a and the fourth pump valve 1118d to close, and causes the second pump valve 1118b and the third pump valve 1118c to open. In this way, the lubricant flows into the hollow interior 1104 from the input flowpath 1110 and through the second inlet 1114b, and the first pump valve 1118a prevents the lubricant from flowing through the first inlet 1114a back into the input flowpath 1110. At the same time, the lubricant flows out of the hollow interior 1104 into the output flowpath 1112 through the first outlet 1116a, and the fourth pump valve 1118d prevents the lubricant from flowing through the second outlet 1116b. Accordingly, the bi-directional pump 1100 pumps the lubricant whether the pump shaft is rotating in the first pump rotational direction or the second pump rotational direction.

Accordingly, the present disclosure provides for supplying the lubricant to the one or more rotating components during a shutdown of the turbine engine or other loss of pressure scenarios (e.g., while the turbine engine is operating). The lubrication system herein supplies the lubricant during windmilling and loss of pressure scenarios regardless of a rotational direction of the fan. For example, the auxiliary lubrication system supplies the lubricant to the one or more rotating components whether the fan is rotating in a first rotational direction or in a second rotational direction that is opposite the first rotational direction. In some embodiments, the auxiliary lubrication system operates passively, for example, based on the pressure of the lubricant from the lubricant pressure signal line, and operates independently of the controller. In this way, the auxiliary lubrication system can operate even if there is a controller failure.

Further aspects of the present disclosure are provided by the subject matter of the following clauses.

A lubrication system for a turbine engine, the turbine engine including a fan having a fan shaft and one or more rotating components, the lubrication system comprising one or more tanks that store lubricant therein, a primary lubrication system supplying the lubricant from the one or more tanks to the one or more rotating components during normal operation of the turbine engine, and an auxiliary lubrication system comprising an auxiliary pump that is coupled to the fan shaft, the auxiliary lubrication system supplying the lubricant from the one or more tanks to the one or more rotating components based on a pressure of the lubricant in the primary lubrication system, rotation of the fan shaft causing the auxiliary pump to pump the lubricant to the one or more rotating components.

The lubrication system of the preceding clause, the one or more rotating components being one or more bearings.

The lubrication system of any preceding clause, the turbine engine including a turbo-engine having one or more shafts, the one or more rotating components being the one or more shafts.

The lubrication system of any preceding clause, the one or more bearings being one or more engine bearings that allow rotation of the one or more shafts of the turbine engine.

The lubrication system of any preceding clause, the turbine engine including a gearbox assembly having a plurality of gears, the fan shaft being coupled to the turbo-engine through the gearbox assembly, the one or more rotating components being the plurality of gears.

The lubrication system of any preceding clause, the one or more bearings being one or more gearbox bearings of the gearbox assembly that allow rotation of the plurality of gears.

The lubrication system of any preceding clause, the auxiliary lubrication system supplying the lubricant to the one or more rotating components when the pressure of the lubricant in the primary lubrication system is less than a primary pressure threshold.

The lubrication system of any preceding clause, the auxiliary lubrication system being prevented from supplying the lubricant to the one or more rotating components when the pressure of the lubricant in the primary lubrication system is greater than a primary pressure threshold.

The lubrication system of any preceding clause, the primary lubrication system including a primary pump and a primary lubricant supply line, the primary pump pumping the lubricant from the one or more tanks to the one or more rotating components through the primary lubricant supply line.

The lubrication system of any preceding clause, further comprising a sump that collects the lubricant that drains from the one or more rotating components.

The lubrication system of any preceding clause, the sump being in fluid communication with the tank, the lubricant being supplied from the sump to the one or more tanks.

The lubrication system of any preceding clause, the auxiliary lubrication system comprising an auxiliary lubricant supply line, the auxiliary pump pumping the lubricant from the one or more tanks to the one or more rotating components through the auxiliary lubricant supply line.

The lubrication system of any preceding clause, further comprising one or more valves in fluid communication with the primary lubricant supply line and the auxiliary lubricant supply line.

The lubrication system of the preceding clause, the one or more valves including a first valve that opens to allow the lubricant to flow from the primary lubrication system to the one or more rotating components, and closes to prevent the lubricant from flowing from the primary lubrication system to the one or more rotating components.

The lubrication system of the preceding clause, the one or more valves including a second valve that opens to allow the lubricant to flow from the auxiliary lubrication system to the one or more rotating components, and closes to prevent the lubricant from flowing from the auxiliary lubrication system to the one or more rotating components.

The lubrication system of the preceding clause, the auxiliary pump including a pump shaft that is coupled to the fan shaft, rotation of the fan shaft causing the pump shaft to rotate such that the auxiliary pump pumps the lubricant.

The lubrication system of any preceding clause, the fan shaft including a fan shaft gear, and the pump shaft including a pump shaft gear that is intermeshed with the fan shaft gear.

The lubrication system of any preceding clause, the auxiliary pump being a bi-directional pump that pumps the lubricant to the one or more rotating components when the fan shaft rotates in a first rotational direction and when the fan shaft rotates in a second rotational direction that is opposite the first rotational direction.

The lubrication system of any preceding clause, the auxiliary lubrication system including a clutch that engages the pump shaft to operate the auxiliary pump or disengages the pump shaft to prevent operation of the auxiliary pump.

The lubrication system of any preceding clause, the clutch disengaging the pump shaft when the pressure of the lubricant in the primary lubrication system is greater than the primary pressure threshold.

The lubrication system of any preceding clause, the clutch engaging the pump shaft when the pressure of the lubricant in the primary lubrication system is less than the primary pressure threshold.

The lubrication system of any preceding clause, further comprising a lubricant pressure signal line that is in fluid communication with the primary lubrication system and the clutch, the lubricant pressure signal line causing the clutch to engage or to disengage based on the pressure of the lubricant in the primary lubrication system.

The lubrication system of any preceding clause, the clutch being coupled to a lubricant pressure switch that causes the clutch to engage or to disengage the pump shaft based on the pressure of the lubricant in the primary lubrication system.

The lubrication system of any preceding clause, the lubricant pressure switch closing to cause the clutch to disengage the pump shaft when the pressure of the lubricant in the primary lubrication system is greater than the primary pressure threshold.

The lubrication system of any preceding clause, the lubricant pressure switch opening to cause the clutch to engage the pump shaft when the pressure of the lubricant in the primary lubrication system is less than the primary pressure threshold.

The lubrication system of any preceding clause, further comprising a power supply in communication with the clutch and supplying power to the clutch to engage or to disengage the pump shaft.

The lubrication system of any preceding clause, the clutch disengaging the pump shaft when the power supply supplies power to the clutch.

The lubrication system of any preceding clause, the clutch engaging the pump shaft when the power supply does not provide power to the clutch.

The lubrication system of any preceding clause, further comprising a controller that is in communication with the clutch to engage or to disengage the pump shaft.

The lubrication system of any preceding clause, further comprising one or more pressure sensors that sense the pressure of the lubricant in the primary lubrication system.

The lubrication system of any preceding clause, the controller receiving the sensed pressure of the lubricant in the primary lubrication system from the one or more pressure sensors.

The lubrication system of any preceding clause, the controller controlling the clutch to disengage the pump shaft when the pressure of the lubricant in the primary lubrication system is greater than the primary pressure threshold.

The lubrication system of any preceding clause, the controller controlling the clutch to engage the pump shaft when the pressure of the lubricant in the primary lubrication system is less than the primary pressure threshold.

The lubrication system of any preceding clause, the controller being in communication with the lubricant pressure switch, the controller controlling the lubricant pressure switch to open or to close based on the pressure of the lubricant in the primary lubrication system.

The lubrication system of any preceding clause, further comprising a motor that powers the primary pump.

The lubrication system of any preceding clause, the motor being a hydraulic motor that is in fluid communication with the auxiliary pump through the auxiliary lubricant line, the auxiliary pump pumping the lubricant to the motor through the auxiliary lubricant line to power the motor, thereby causing the primary pump to pump the lubricant from the one or more tanks to the one or more rotating components.

The lubrication system of any preceding clause, further comprising a control signal switch that causes the clutch to engage or to disengage based on a control signal from the controller.

The lubrication system of any preceding clause, the control signal switch causing the clutch to disengage the pump shaft when the control signal switch receives a control signal from the controller.

The lubrication system of any preceding clause, the control signal switch causing the clutch to engage the pump shaft when the control signal switch does not receive the control signal from the controller.

The lubrication system of any preceding clause, the clutch being a centrifugal clutch that engages or disengages based on a rotational speed of the fan.

The lubrication system of any preceding clause, the clutch disengaging the pump shaft when the rotational speed of the fan is greater than a fan speed threshold.

The lubrication system of any preceding clause, the clutch engaging the pump shaft when the rotational speed of the fan is less than the fan speed threshold.

The lubrication system of any preceding clause, the auxiliary pump being a uni-directional pump that pumps the lubricant to the one or more rotating components based on a single rotational direction of the pump shaft.

The lubrication system of any preceding clause, the clutch being a first clutch, the lubrication system further comprising a second clutch and a third clutch, the second clutch and the third clutch being one-way clutches that rotate in opposite directions.

The lubrication system of any preceding clause, the third clutch being coupled to a reversing gear that reverses a rotational direction of the third clutch to the rotational direction of the pump shaft.

The lubrication system of any preceding clause, the second clutch and the third clutch being sprag clutches.

The lubrication system of any preceding clause, the one or more rotating components including one or more first rotating components and one or more second rotating components, the primary lubrication system supplying the lubricant to the one or more first rotating components, and the auxiliary lubrication system supplying the lubricant to the one or more second rotating components.

The lubrication system of any preceding clause, the auxiliary lubrication system comprising a pressure regulator, the pressure regulator directing at least a portion of the lubricant to the one or more tanks to bypass the one or more second rotating components during normal operation of the turbine engine.

The lubrication system of any preceding clause, the pressure regulator directing substantially all of the lubricant in the auxiliary lubrication system to the one or more second rotating components when the pressure of the lubricant in the primary lubrication system is less than the primary pressure threshold.

The lubrication system of any preceding clause, the one or more first rotating components being one or more engine bearings.

The lubrication system of any preceding clause, the one or more second rotating components being one or more gearbox bearings.

The lubrication system of any preceding clause, the auxiliary pump being a bi-directional pump.

The lubrication system of the preceding clause, the bi-directional pump including a first hollow interior and a second hollow interior, and a first piston within the first hollow interior and a second piston within the second hollow interior.

The lubrication system of the preceding clause, the first piston and the second piston being coupled to the pump shaft such that rotation of the pump shaft causes the first piston and the second piston to move up or to move down.

The lubrication system of any preceding clause, the bi-directional pump including an input flowpath having a first inlet in fluid communication with the first hollow interior and a second inlet in fluid communication with the second hollow interior.

The lubrication system of any preceding clause, the bi-directional pump including an output flowpath having a first outlet in fluid communication with the first hollow interior and a second outlet in fluid communication with the second hollow interior.

The lubrication system of any preceding clause, the bi-directional pump including a plurality of pump valves including a first valve in fluid communication with the first inlet, a second valve in fluid communication with the first outlet, a third valve in fluid communication with the second inlet, and a fourth valve in fluid communication with the second outlet.

The lubrication system of any preceding clause, the first valve opening to allow the lubricant to flow into the first hollow interior through the first inlet when the first piston moves down.

The lubrication system of any preceding clause, the second valve opening to allow the lubricant to flow into the outlet flowpath and out of the first hollow interior through the first outlet when the first piston moves up.

The lubrication system of any preceding clause, the third valve opening to allow the lubricant to flow into the second hollow interior through the second inlet when the second piston moves down.

The lubrication system of any preceding clause, the fourth valve opening to allow the lubricant to flow into the outlet flowpath and out of the second hollow interior through the second outlet when the second piston moves up.

The lubrication system of any preceding clause, the bi-directional pump including a hollow interior and a plurality of gears disposed within the hollow interior.

The lubrication system of any preceding clause, the bi-directional pump including a first inlet and a first outlet disposed at a first axial side of the hollow interior.

The lubrication system of any preceding clause, the bi-directional pump including a second inlet and a second outlet disposed at a second axial side of the hollow interior.

The lubrication system of any preceding clause, the bi-directional pump including a plurality of pump valves including a first pump valve in fluid communication with the first inlet, a second pump valve in fluid communication with the second inlet, a third pump valve in fluid communication with the first outlet, and a fourth pump valve in fluid communication with the second outlet.

The lubrication system of the preceding clause, the first pump valve and the fourth pump valve opening and the second pump valve and the third pump valve closing to allow the lubricant to flow from the input flowpath to the outlet flowpath through the first inlet and the second outlet when the fan rotates in a first rotational direction.

The lubrication system of any preceding clause, the second pump valve and the third pump valve opening and the first pump valve and the fourth pump valve closing to allow the lubricant to flow from the input flowpath to the outlet flowpath through the second inlet and the first outlet when the fan rotates in a second rotational direction.

A turbine engine comprising a fan and a turbo-engine, and a lubrication system. The fan is coupled to the turbo-engine.

The turbine engine comprises one or more rotating components. The lubrication system being the lubrication system of any preceding clause.

A method of operating the lubrication system of any preceding clause, the method comprising supplying the lubricant through the primary lubrication system from one or more tanks to the one or more rotating components during normal operation of the turbine engine, and supplying the lubricant through the auxiliary lubrication system to the one or more rotating components based on a pressure of the lubricant in the primary lubrication system by pumping the lubricant with the auxiliary pump, the turbine engine including a fan having a fan shaft and rotation of the fan shaft causes the auxiliary pump to pump the lubricant to the one or more rotating components.

The method of the preceding clause, the one or more rotating components being one or more bearings.

The method of any preceding clause, the turbine engine including a turbo-engine having one or more shafts, the one or more rotating components being the one or more shafts.

The method of any preceding clause, the one or more bearings being one or more engine bearings that allow rotation of the one or more shafts of the turbine engine.

The method of any preceding clause, the turbine engine including a gearbox assembly having a plurality of gears, the fan shaft being coupled to the turbo-engine through the gearbox assembly, the one or more rotating components being the plurality of gears.

The method of the preceding clause, further comprising supplying the lubricant through the auxiliary lubrication system to the one or more rotating components when the pressure of the lubricant in the primary lubrication system is less than a primary pressure threshold.

The method any preceding clause, further comprising preventing the auxiliary lubrication system from supplying the lubricant to the one or more rotating components when the pressure of the lubricant in the primary lubrication system is greater than a primary pressure threshold.

The method of any preceding clause, the primary lubrication system including a primary pump and a primary lubricant supply line, the method further comprising pumping, with the primary pump, the lubricant from the one or more tanks to the one or more rotating components through the primary lubricant supply line.

The method of any preceding clause, further comprising collecting, with a sump, the lubricant that drains from the one or more rotating components.

The method of any preceding clause, further comprising supplying the lubricant from the sump to the one or more tanks.

The method of any preceding clause, the auxiliary lubrication system comprising an auxiliary lubricant supply line, the method further comprising pumping, with the auxiliary pump, the lubricant from the one or more tanks to the one or more rotating components through the auxiliary lubricant supply line.

The method of any preceding clause, further comprising one or more valves in fluid communication with the primary lubricant supply line and the auxiliary lubricant supply line.

The method of the preceding clause, the one or more valves including a first valve, the method further comprising opening the first valve to allow the lubricant to flow from the primary lubrication system to the one or more rotating components, and closing the first valve to prevent the lubricant from flowing from the primary lubrication system to the one or more rotating components.

The method of the preceding clause, the one or more valves including a second valve, the method further comprising opening the second valve to allow the lubricant to flow from the auxiliary lubrication system to the one or more rotating components, and closing the second valve to prevent the lubricant from flowing from the auxiliary lubrication system to the one or more rotating components.

The method of any preceding clause, the auxiliary pump including a pump shaft that is coupled to the fan shaft, the method further comprising causing the pump shaft to rotate such that the auxiliary pump pumps the lubricant when the fan shaft rotates.

The method of any preceding clause, the fan shaft including a fan shaft gear, and the pump shaft including a pump shaft gear that is intermeshed with the fan shaft gear.

The method of any preceding clause, the auxiliary pump being a bi-directional pump that pumps the lubricant to the one or more rotating components when the fan shaft rotates in a first rotational direction and when the fan shaft rotates in a second rotational direction that is opposite the first rotational direction.

The method of any preceding clause, further comprising engaging the pump shaft with a clutch to operate the auxiliary pump, and disengaging the pump shaft to prevent operation of the auxiliary pump.

The method of any preceding clause, further comprising disengaging the pump shaft with the clutch when the pressure of the lubricant in the primary lubrication system is greater than the primary pressure threshold.

The method of any preceding clause, further comprising engaging the pump shaft with the clutch when the pressure of the lubricant in the primary lubrication system is less than the primary pressure threshold.

The method of any preceding clause, the auxiliary lubrication system further comprising a lubricant pressure signal line that is in fluid communication with the primary lubrication system and the clutch, the method further comprising causing the clutch to engage or to disengage the pump shaft based on the pressure of the lubricant in the primary lubrication system from the lubricant pressure signal line.

The method of any preceding clause, the clutch being coupled to a lubricant pressure switch, the method further comprising causing, with the lubricant pressure switch, the clutch to engage or to disengage the pump shaft based on the pressure of the lubricant in the primary lubrication system.

The method of any preceding clause, further comprising closing the lubricant pressure switch to cause the clutch to disengage the pump shaft when the pressure of the lubricant in the primary lubrication system is greater than the primary pressure threshold.

The method of any preceding clause, further comprising opening the lubricant pressure switch to cause the clutch to engage the pump shaft when the pressure of the lubricant in the primary lubrication system is less than the primary pressure threshold.

The method of any preceding clause, the auxiliary lubrication system further comprising a power supply in communication with the clutch, the method further comprising supplying, with the power supply, power to the clutch to engage or to disengage the pump shaft.

The method of any preceding clause, further comprising disengaging the pump shaft with the clutch when the power supply supplies power to the clutch.

The method of any preceding clause, further comprising engaging the pump shaft with the clutch when the power supply does not provide power to the clutch.

The method of any preceding clause, further comprising controlling the clutch with a controller to engage or to disengage the pump shaft.

The method of any preceding clause, further comprising sensing the pressure of the lubricant in the primary lubrication system with one or more pressure sensors.

The method of any preceding clause, further comprising sending the sensed pressure of the lubricant in the primary lubrication system from the one or more pressure sensors to the controller.

The method of any preceding clause, further comprising controlling, with the controller, the clutch to disengage the pump shaft when the pressure of the lubricant in the primary lubrication system is greater than the primary pressure threshold.

The method of any preceding clause, further comprising controlling, with the controller, the clutch to engage the pump shaft when the pressure of the lubricant in the primary lubrication system is less than the primary pressure threshold.

The method of any preceding clause, further comprising controlling, with the controller, the lubricant pressure switch to open or to close based on the pressure of the lubricant in the primary lubrication system.

The method of any preceding clause, further comprising powering the primary pump with a motor.

The method of any preceding clause, the motor being a hydraulic motor that is in fluid communication with the auxiliary pump through the auxiliary lubricant line, the method further comprising pumping, with the auxiliary pump, the lubricant to the motor through the auxiliary lubricant line to power the motor, thereby causing the primary pump to pump the lubricant from the one or more tanks to the one or more rotating components.

The method of any preceding clause, further comprising causing, with a control signal switch, the clutch to engage or to disengage based on a control signal from the controller.

The method of any preceding clause, further comprising causing the clutch to disengage the pump shaft when the control signal switch receives a control signal from the controller.

The method of any preceding clause, further comprising causing the clutch to engage the pump shaft when the control signal switch does not receive the control signal from the controller.

The method of any preceding clause, the clutch being a centrifugal clutch, the method further comprising engaging or disengaging the pump shaft with the clutch based on a rotational speed of the fan.

The method of any preceding clause, further comprising disengaging the pump shaft with the clutch when the rotational speed of the fan is greater than a fan speed threshold.

The method of any preceding clause, further comprising engaging the pump shaft with the clutch when the rotational speed of the fan is less than the fan speed threshold.

The method of any preceding clause, the auxiliary pump being a uni-directional pump that pumps the lubricant to the one or more rotating components based on a single rotational direction of the pump shaft.

The method of any preceding clause, the clutch being a first clutch, the lubrication system further comprising a second clutch and a third clutch, the second clutch and the third clutch being one-way clutches that rotate in opposite directions.

The method of any preceding clause, the third clutch being coupled to a reversing gear that reverses a rotational direction of the third clutch to the rotational direction of the pump shaft.

The method of any preceding clause, the second clutch and the third clutch being sprag clutches.

The method of any preceding clause, the one or more rotating components including one or more first rotating components and one or more second rotating components, the method further comprising supplying the lubricant to the one or more first rotating components with the primary lubrication system, and supplying the lubricant to the one or more second rotating components with the auxiliary lubrication system.

The method of any preceding clause, the auxiliary lubrication system comprising a pressure regulator, the method further comprising directing, with the pressure regulator, at least a portion of the lubricant to the one or more tanks to bypass the one or more second rotating components during normal operation of the turbine engine.

The method of any preceding clause, further comprising directing, with the pressure regulator, substantially all of the lubricant in the auxiliary lubrication system to the one or more rotating components when the pressure of the lubricant in the primary lubrication system is less than the primary pressure threshold.

The method of any preceding clause, the one or more first rotating components being one or more engine bearings.

The method of any preceding clause, the one or more second rotating components being one or more gearbox bearings.

The method of any preceding clause, the auxiliary pump being a bi-directional pump.

The method of the preceding clause, the bi-directional pump including a first hollow interior and a second hollow interior, and a first piston within the first hollow interior and a second piston within the second hollow interior.

The method of the preceding clause, the first piston and the second piston being coupled to the pump shaft such that rotation of the pump shaft causes the first piston and the second piston to move up or to move down.

The method of any preceding clause, the bi-directional pump including an input flowpath having a first inlet in fluid communication with the first hollow interior and a second inlet in fluid communication with the second hollow interior.

The method of any preceding clause, the bi-directional pump including an output flowpath having a first outlet in fluid communication with the first hollow interior and a second outlet in fluid communication with the second hollow interior.

The method of any preceding clause, the bi-directional pump including a plurality of pump valves including a first valve in fluid communication with the first inlet, a second valve in fluid communication with the first outlet, a third valve in fluid communication with the second inlet, and a fourth valve in fluid communication with the second outlet.

The method of any preceding clause, further comprising opening the first valve to allow the lubricant to flow into the first hollow interior through the first inlet when the first piston moves down.

The method of any preceding clause, further comprising opening the second valve to allow the lubricant to flow into the outlet flowpath and out of the first hollow interior through the first outlet when the first piston moves up.

The method of any preceding clause, further comprising opening the third valve to allow the lubricant to flow into the second hollow interior through the second inlet when the second piston moves down.

The method of any preceding clause, further comprising opening the fourth valve to allow the lubricant to flow into the outlet flowpath and out of the second hollow interior through the second outlet when the second piston moves up.

The method of any preceding clause, the bi-directional pump including a hollow interior and a plurality of gears disposed within the hollow interior.

The method of any preceding clause, the bi-directional pump including a first inlet and a first outlet disposed at a first axial side of the hollow interior.

The method of any preceding clause, the bi-directional pump including a second inlet and a second outlet disposed at a second axial side of the hollow interior.

The method of any preceding clause, the bi-directional pump including a plurality of pump valves including a first pump valve in fluid communication with the first inlet, a second pump valve in fluid communication with the second inlet, a third pump valve in fluid communication with the first outlet, and a fourth pump valve in fluid communication with the second outlet.

The method of the preceding clause, further comprising opening the first pump valve and the fourth pump valve and closing the second pump valve and the third pump valve to allow the lubricant to flow from the input flowpath to the outlet flowpath through the first inlet and the second outlet when the fan rotates in a first rotational direction.

The method of any preceding clause, further comprising opening the second pump valve and the third pump valve and closing the first pump valve and the fourth pump valve to allow the lubricant to flow from the input flowpath to the outlet flowpath through the second inlet and the first outlet when the fan rotates in a second rotational direction.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a turbine engine, the turbine engine including a fan having a fan shaft, one or more rotating components, and a turbine section having a turbine shaft that is drivingly coupled to the fan shaft, the lubrication system comprising:
   one or more tanks that store lubricant therein;
   a primary lubrication system supplying the lubricant from the one or more tanks to the one or more rotating components during normal operation of the turbine engine; and
   an auxiliary lubrication system comprising an auxiliary pump that is coupled to the fan shaft via a coupling device, the auxiliary lubrication system supplying the lubricant from the one or more tanks to the one or more rotating components based on a pressure of the lubricant in the primary lubrication system,
   wherein (1) when the pressure of the lubricant in the primary lubrication system is greater than a primary pressure threshold, the coupling device is controlled to disengage from the fan shaft so that the auxiliary pump is disengaged and does not pump the lubricant through the auxiliary lubrication system, and (2) when the pressure of the lubricant in the primary lubrication system is less than the primary pressure threshold, the coupling device is controlled to engage with the fan shaft such that rotation of the fan shaft causes the auxiliary pump to pump the lubricant to the one or more rotating components.

2. The lubrication system of claim 1, wherein the one or more rotating components comprise at least one of one or more bearings, one or more shafts of a turbo-engine, or one or more gears of a gearbox assembly.

3. The lubrication system of claim 1, wherein the auxiliary pump is a bi-directional pump that pumps the lubricant to the one or more rotating components when the fan shaft rotates in a first rotational direction and when the fan shaft rotates in a second rotational direction that is opposite the first rotational direction.

4. The lubrication system of claim 1, wherein the auxiliary pump includes a pump shaft that is coupled to the fan shaft via the coupling device.

5. The lubrication system of claim 1, wherein the coupling device comprises a clutch that engages the pump shaft to operate the auxiliary pump or disengages the pump shaft to prevent operation of the auxiliary pump.

6. The lubrication system of claim 1, wherein the primary lubrication system includes a primary pump and a primary lubricant supply line, the primary pump pumping the lubricant from the one or more tanks to the one or more rotating components through the primary lubricant supply line.

7. The lubrication system of claim 6, wherein the auxiliary lubrication system includes an auxiliary lubricant supply line, the auxiliary pump pumping the lubricant from the one or more tanks to the one or more rotating components through the auxiliary lubricant supply line.

8. The lubrication system of claim 7, further comprising one or more valves in fluid communication with the primary lubricant supply line and the auxiliary lubricant supply line, the one or more valves comprising:
   a first valve that opens to allow the lubricant to flow from the primary lubrication system to the one or more rotating components, and closes to prevent the lubricant from flowing from the primary lubrication system to the one or more rotating components; and
   a second valve that opens to allow the lubricant to flow from the auxiliary lubrication system to the one or more rotating components, and closes to prevent the lubricant from flowing from the auxiliary lubrication system to the one or more rotating components.

9. A method of operating a lubrication system for a turbine engine, the turbine engine including a fan having a fan shaft, one or more rotating components, and a turbine section having a turbine shaft that is drivingly coupled to the fan shaft, the method comprising:
   supplying lubricant through a primary lubrication system from one or more tanks to one or more rotating components of the turbine engine during normal operation of the turbine engine; and
   supplying the lubricant through an auxiliary lubrication system having an auxiliary pump that is coupled to the fan shaft via a coupling device to the one or more rotating components based on a pressure of the lubricant in the primary lubrication system by pumping the lubricant with the auxiliary pump; and
   controlling the coupling device to engage with the fan shaft and to disengage from the fan shaft,
   wherein (1) when the pressure of the lubricant in the primary lubrication system is greater than a primary pressure threshold, the coupling device is controlled to disengage from the fan shaft so that the auxiliary pump is disengaged and does not pump the lubricant through the auxiliary lubrication system, and (2) when the pressure of the lubricant in the primary lubrication system is less than the primary pressure threshold, the coupling device is controlled to engage with the fan shaft such that rotation of the fan shaft causes the auxiliary pump to pump the lubricant to the one or more rotating components.

10. The method of claim 9, wherein the one or more rotating components comprise at least one of one or more bearings, one or more shafts of a turbo-engine, or one or more gears of a gearbox assembly.

11. The method of claim 9, wherein the auxiliary pump is a bi-directional pump that pumps the lubricant to the one or more rotating components when the fan shaft rotates in a first rotational direction and when the fan shaft rotates in a second rotational direction that is opposite the first rotational direction.

12. The method of claim 9, wherein the auxiliary pump includes including a pump shaft that is coupled to the fan shaft via the coupling device.

13. The method of claim 9, wherein the coupling device comprises a clutch that engages the pump shaft to operate the auxiliary pump, and disengages the pump shaft to prevent operation of the auxiliary pump.

14. The method of claim 9, wherein the primary lubrication system includes a primary pump and a primary lubricant supply line, the method further comprising pumping, with the primary pump, the lubricant from the one or more tanks to the one or more rotating components through the primary lubricant supply line.

15. The method of claim 14, wherein the auxiliary lubrication system includes an auxiliary lubricant supply line, the method further comprising pumping, with the auxiliary pump, the lubricant from the one or more tanks to the one or more rotating components through the auxiliary lubricant supply line.

16. The method of claim 15, further comprising one or more valves in fluid communication with the primary lubricant supply line and the auxiliary lubricant supply line, the one or more valves including a first valve and a second valve, the method further comprising:
 opening the first valve to allow the lubricant to flow from the primary lubrication system to the one or more rotating components, and closing the first valve to prevent the lubricant from flowing from the primary lubrication system to the one or more rotating components; and
 opening the second valve to allow the lubricant to flow from the auxiliary lubrication system to the one or more rotating components, and closing the second valve to prevent the lubricant from flowing from the auxiliary lubrication system to the one or more rotating components.

* * * * *